(12) United States Patent
Kunieda

(10) Patent No.: US 8,363,883 B2
(45) Date of Patent: Jan. 29, 2013

(54) IMAGE PROCESSING APPARATUS AND IMAGE PROCESSING METHOD

(75) Inventor: Hiroyasu Kunieda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1067 days.

(21) Appl. No.: 12/030,454

(22) Filed: Feb. 13, 2008

(65) Prior Publication Data

US 2008/0205698 A1 Aug. 28, 2008

(30) Foreign Application Priority Data

Feb. 28, 2007 (JP) ................................. 2007-050198

(51) Int. Cl.
*G06K 9/00* (2006.01)
*G06K 9/46* (2006.01)
*G06K 9/66* (2006.01)
*H04N 1/44* (2006.01)

(52) U.S. Cl. ........ 382/100; 382/155; 382/181; 382/190; 382/232; 380/245

(58) Field of Classification Search .................. 382/100, 382/155–161; 380/245
See application file for complete search history.

(56) References Cited

U.S. PATENT DOCUMENTS

| | | | | |
|---|---|---|---|---|
| 5,526,438 A * | 6/1996 | Barton | ........................... | 382/237 |
| 7,058,232 B1 | 6/2006 | Miyake | ........................... | 382/252 |
| 7,085,399 B2 * | 8/2006 | Suzaki | ........................... | 382/100 |
| 7,227,661 B2 * | 6/2007 | Matsunoshita | ............... | 358/1.15 |
| 7,369,677 B2 * | 5/2008 | Petrovic et al. | ................ | 382/100 |
| 7,386,148 B2 * | 6/2008 | Seroussi | ........................ | 382/100 |
| 7,489,796 B2 * | 2/2009 | Nakamura et al. | ............ | 382/100 |
| 7,634,105 B2 * | 12/2009 | Moroo et al. | .................. | 382/100 |
| 7,826,074 B1 * | 11/2010 | Wang et al. | ................... | 358/1.13 |
| 2003/0058480 A1 | 3/2003 | Miyake et al. | .............. | 358/426.1 |
| 2006/0133647 A1 * | 6/2006 | Werner et al. | ................. | 382/100 |
| 2008/0025620 A1 * | 1/2008 | Sugita | ........................... | 382/232 |
| 2009/0074242 A1 * | 3/2009 | Yamamoto et al. | ........... | 382/100 |

FOREIGN PATENT DOCUMENTS

| | | |
|---|---|---|
| JP | 2000-309132 | 11/2000 |
| JP | 2001-148778 | 5/2001 |
| JP | 2002-354227 | 12/2002 |
| JP | 2003-101760 | 4/2003 |

* cited by examiner

*Primary Examiner* — Matthew Bella
*Assistant Examiner* — Jose M Torres
(74) *Attorney, Agent, or Firm* — Fitzpatrick, Cella, Harper & Scinto

(57) ABSTRACT

In image processing for embedding additional information in an image, degradation of image quality due to consecution of the same code is suppressed. Hence, determination whether or not the same code consecutively appears in additional information is performed, an embedding condition for embedding a code in an image controlled based on the code consecution, and the additional information is embedded in the image in accordance with the embedding condition.

14 Claims, 26 Drawing Sheets

FIG. 4

ADDITIONAL INFORMATION AS
ONE-DIMENSIONAL FORM (SERIAL DATA)

30003100001300···  ⇨

| P | | | | | |
|---|---|---|---|---|---|
| 3 | 0 | 0 | 0 | 3 | 1 |
| 0 | 0 | 0 | 0 | 1 | 3 |
| 0 | 0 | 0 | 0 | 0 | 0 |
| 0 | 0 | 0 | 0 | 0 | 0 |
| 1 | 0 | 0 | 0 | 1 | 3 |
| 2 | 0 | 0 | 0 | 2 | ··· |

12'

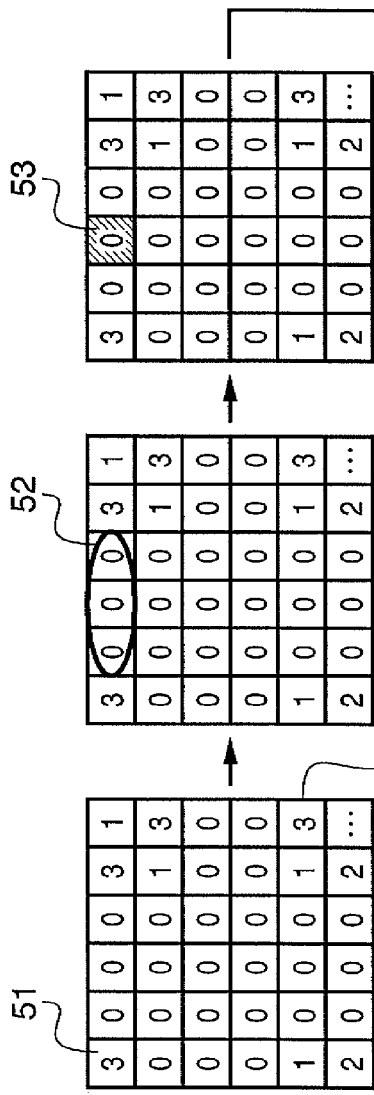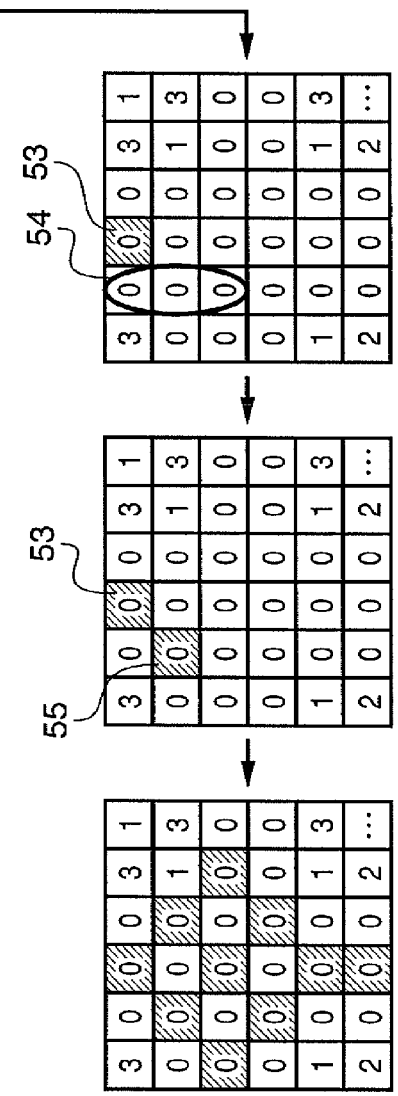

FIG. 6
| | CONDITION A | CONDITION B |
|---|---|---|
| CODE 0 | 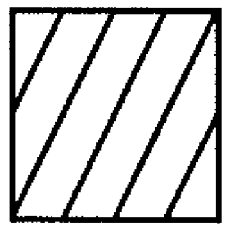 | 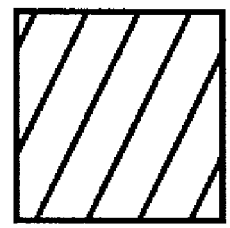 |
| CODE 1 | 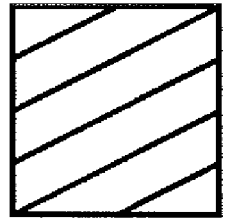 |  |
| CODE 2 | 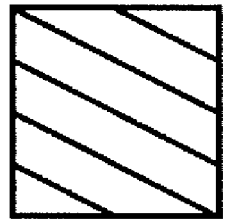 |  |
| CODE 3 | 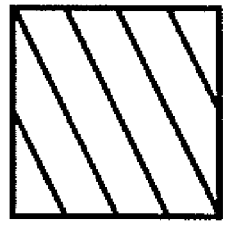 | 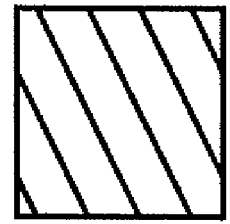 |

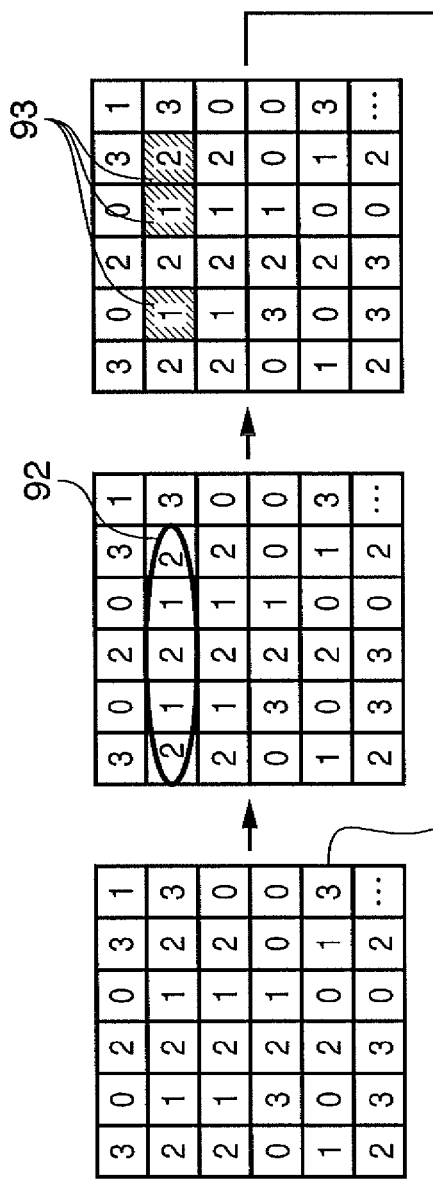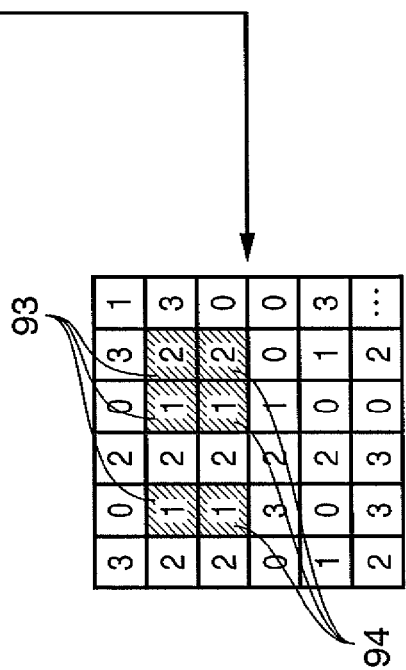
FIG. 12A  FIG. 12B  FIG. 12C  FIG. 12D

FIG. 14

| | BEFORE CODE CHANGE | | AFTER CODE CHANGE |
|---|---|---|---|
| CODE 0 | ▨ | CODE 4 | ☰ |
| CODE 1 | ▨ | CODE 5 | ▨ |
| CODE 2 | ▨ | CODE 6 | ▥ |
| CODE 3 | ▨ | CODE 7 | ▨ |

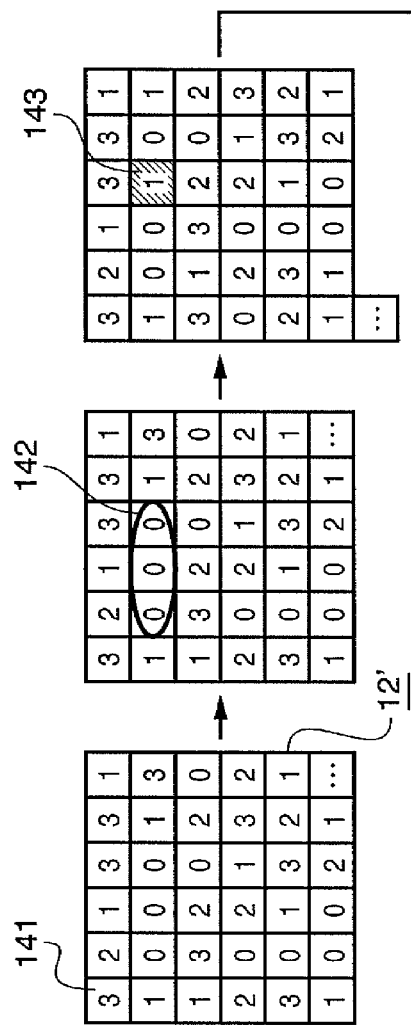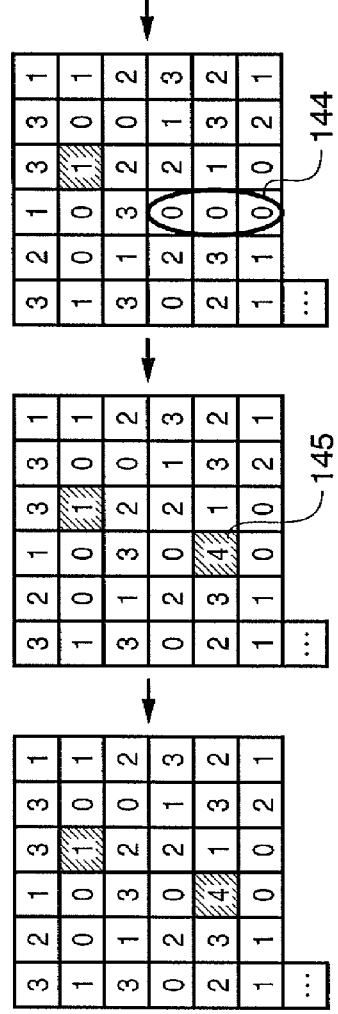

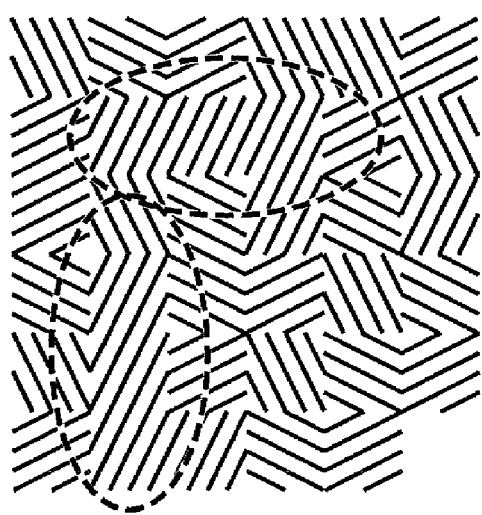 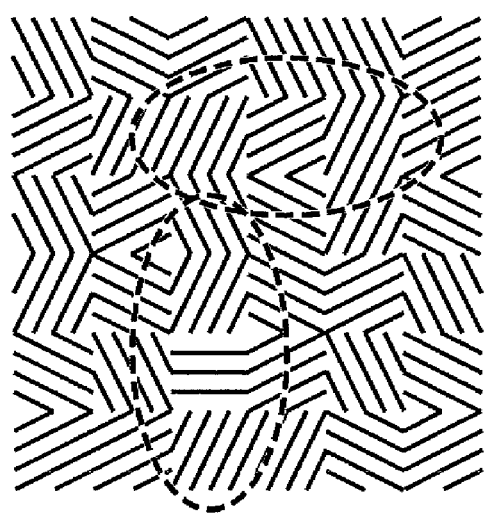
F I G. 20A    F I G. 20B

| 3 | 0 | 1 | 0 | 3 | 1 |
|---|---|---|---|---|---|
| 0 | 0 | 0 | 0 | 1 | 3 |
| 0 | 0 | 0 | 0 | 0 | 0 |
| 0 | 0 | 0 | 0 | 0 | 0 |
| 1 | 0 | 0 | 0 | 1 | 3 |
| 2 | 0 | 0 | 0 | 2 | ... |

F I G. 24A

(Remaining subfigures 24B–24I show the same 6-column grid progressively partitioned into DENSE REGION and SPARSE REGION, with cells being marked/highlighted through successive steps labeled 231, 233, 234, 235, 236, 237, 238.)

IMAGE PROCESSING APPARATUS AND IMAGE PROCESSING METHOD

BACKGROUND OF THE INVENTION

1. Field of the Invention

The present invention relates to image processing for embedding additional information in an image.

2. Description of the Related Art

Techniques for embedding information related to an image in image information are being actively studied. In recent years, a so-called digital watermarking techniques has been standardized. With this technique, upon distribution of image information of a photograph, a picture or the like via, e.g., the Internet, additional information such as an author name and an authorized/unauthorized state is embedded in the image information such that the additional information cannot be visually discriminated.

Further, in a method using density patterning, additional information is embedded by utilizing a code book where an output pattern is set in correspondence with luminance. That is, an output pattern corresponding to a code to be embedded is recorded in the code book for a particular luminance. This code book is used for determining an output pattern corresponding to a code to be embedded, and additional information is embedded in an image region.

Further, in a method using ordered dithering, dither matrices A and B are utilized, and a threshold value matrix is changed in correspondence with additional binary information. In the matrix B, adjacent row components in the matrix A are exchanged. A matrix is selected in correspondence with additional information to be embedded, and an image for release and an image for verification are generated. When the image for release and the image for verification are overlapped with each other, the embedded additional information can be extracted.

Further, in a method utilizing ordered dithering, additional information is embedded by utilizing a deviation of correlation in an arbitrary-sized dither matrix. A coefficient of a low-correlation dither matrix is changed in correspondence with a code to be embedded. At this time, an image is divided into blocks by dither matrix size, and a code is embedded in a block. The block where the code is embedded is held as a private key.

Further, in a method utilizing pixel substitution, additional information is embedded by substituting the additional information with bits on a particular bit plane. The bit plane where embedding processing has been performed and the pixel positions are held as a private key. Further, the image information and the additional information may be exchanged not in the pixel position but in a bit stream. Further, the result of an exclusive OR between the additional information and a shift register series may be embedded.

Further, as a method utilizing pixel substitution, the patchwork method is known. In this method, an image is divided into blocks of an arbitrary size, and a variance value for correlation among arbitrary pixels in a block is shifted in correspondence with additional information.

Further, in a method utilizing frequency transformation, additional information is embedded in a high frequency component of image data that has been transformed to frequency component data by discrete Fourier transformation. The position where the additional information has been embedded is held as a private key.

Further, in a method for embedding additional information in a JPEG image, a transformation coefficient in a discrete cosine transformation is manipulated. A particular coefficient value in each divided block is changed in correspondence with the additional information, thereby the additional information can be embedded.

Further, in a method for embedding additional information in a color image, additional information is embedded only in a particular color plane among RGB colors. By utilizing the above-described density pattern method, the pixel substitution method, or the like, the additional information is embedded in a particular plane.

Further, as an application of digital watermarking, forgery prevention or forgery tracking is known. By utilizing the technique, unauthorized duplication (forgery) of bank notes, stamps, marketable securities and the like in accordance with the availability of high-quality image output devices such as a copier and a printer can be prevented. That is, additional information is embedded in an image so as to specify a serial number or the like of an image output device from an image printed on a paper sheet.

Further, in a method utilizing error diffusion, additional information is embedded by periodically changing a quantization threshold value when performing error diffusion processing, in correspondence with additional information to be embedded, thereby forming a modulated periodic pattern in an image. Further, in a method utilizing a particular ink color for embedding additional information, a pattern corresponding to the additional information is embedded in a particular ink color plane, and thereby the additional information is embedded in a print image. Note that image information processed for a digital watermark using the above-described density pattern method, pixel substitution method, or frequency transformation method may be output.

Regarding these various digital watermark embedding methods, to solve problems such as robustness improvement upon extraction of additional information and improvement of the quality of an image including additional embedded information, the following methods are proposed.

Japanese Patent Application Laid-Open No. 2003-101760 discloses, upon embedding additional information in an image region, selecting a method for embedding the additional information based on spatial coordinates of a print medium, in consideration of printing differences due to precision of a printing device. Further, Japanese Patent Application Laid-Open No. 2003-101760 discloses selecting a method for extracting the additional information based on the spatial coordinates upon reading an original, in consideration of differences in the precision of an extractor.

Japanese Patent Application Laid-Open No. 2000-301932 discloses, upon performing image formation by repeating printing via repetitive main scanning and subscanning of a print head of a printer and a print medium, embedding additional information in a part of the main scanning processing, and not embedding the additional information in another part of the main scanning processing. By this arrangement, degradation of performance of additional information extraction due to partial image overlap in a subscanning direction can be prevented.

Japanese Patent Application Laid-Open No. 2002-354227 discloses analyzing an image in which additional information is to be embedded by region, and based on the analysis result, changing the amount of additional information to be embedded by region, in correspondence with a visual digital watermark recognition level.

However, in the technique of changing the method for embedding based on the spatial coordinates of the print medium, as disclosed in Japanese Patent Application Laid- Open No. 2003-101760, when the same code is consecutively embedded, pattern consecution occurs and the image quality is degraded.

Further, in the technique of embedding the additional information only in a particular part of the main scanning processing, as disclosed in Japanese Patent Application Laid-Open No. 2000-301932, when the same code is consecutively embedded in a particular part of the main scanning processing, pattern consecution occurs and the image quality is degraded.

Further, in the technique of analyzing and changing the embedding processing by image region disclosed in Japanese Patent Application Laid-Open No. 2002-354227, when the same code is consecutively embedded, pattern consecution occurs and the image quality is degraded.

Note that in methods other than the above-described digital watermark embedding methods for embedding a particular pattern in an image region, when additional information in which the same code consecutively appears is embedded, the same embedding processing is repeated. This causes low frequency noise and degrades image quality.

SUMMARY OF THE INVENTION

In one aspect, an image processing method comprising determining whether or not the same code consecutively appears in additional information, controlling an embedding condition for embedding a code in an image based on the code consecution, and embedding the additional information in the image in accordance with the embedding condition.

In another aspect, an image processing method comprising searching for code consecution in additional information arranged as a two-dimensional form, inserting a code in the additional information or changing a code of the additional information based on the code consecution, and embedding the additional information in an image.

According to these aspects, when additional information is embedded in an image, degradation of image quality due to embedding of consecution of same code can be suppressed.

Further features of the present invention will become apparent from the following description of exemplary embodiments with reference to the attached drawings.

BRIEF DESCRIPTION OF THE DRAWINGS

FIG. 4 is an explanatory view of rearrangement of additional information into a two-dimensional form;

FIGS. 5A to 5F are explanatory views of a consecution search procedure;

FIG. 6 shows two types of embedding conditions with different phases for respective codes;

FIGS. 12A to 12D are explanatory views of an example of a search in which regular appearance of code is determined as code consecution;

FIG. 14 shows an example of the relation between pre-change and post-change of the codes and the embedded pattern upon code change;

FIGS. 15A to 15F are explanatory views of the consecution search procedure and code insertion/change;

FIGS. 20A and 20B show effects of embedding of the additional information in consideration of code consecution;

FIGS. 24A to 24I are explanatory views of processing by a consecution search unit (consecution search procedure);

DESCRIPTION OF THE EMBODIMENTS

Hereinbelow, image processing according to exemplary embodiments of the present invention will be described in detail based on the drawings. Note that in the flowing description, an image processing system having an image processing apparatus for embedding additional information (Hereinbelow, "information adding device") and an image processing apparatus for extracting the additional information (Hereinbelow, "information extracting device") will be described.

First Embodiment

In the image processing system according to a first embodiment, degradation of image quality due to consecution of additional information can be avoided by changing multiplexing processing setting condition in correspondence with consecution of additional information to be embedded.

[Information Adding Device]

Figure 1:
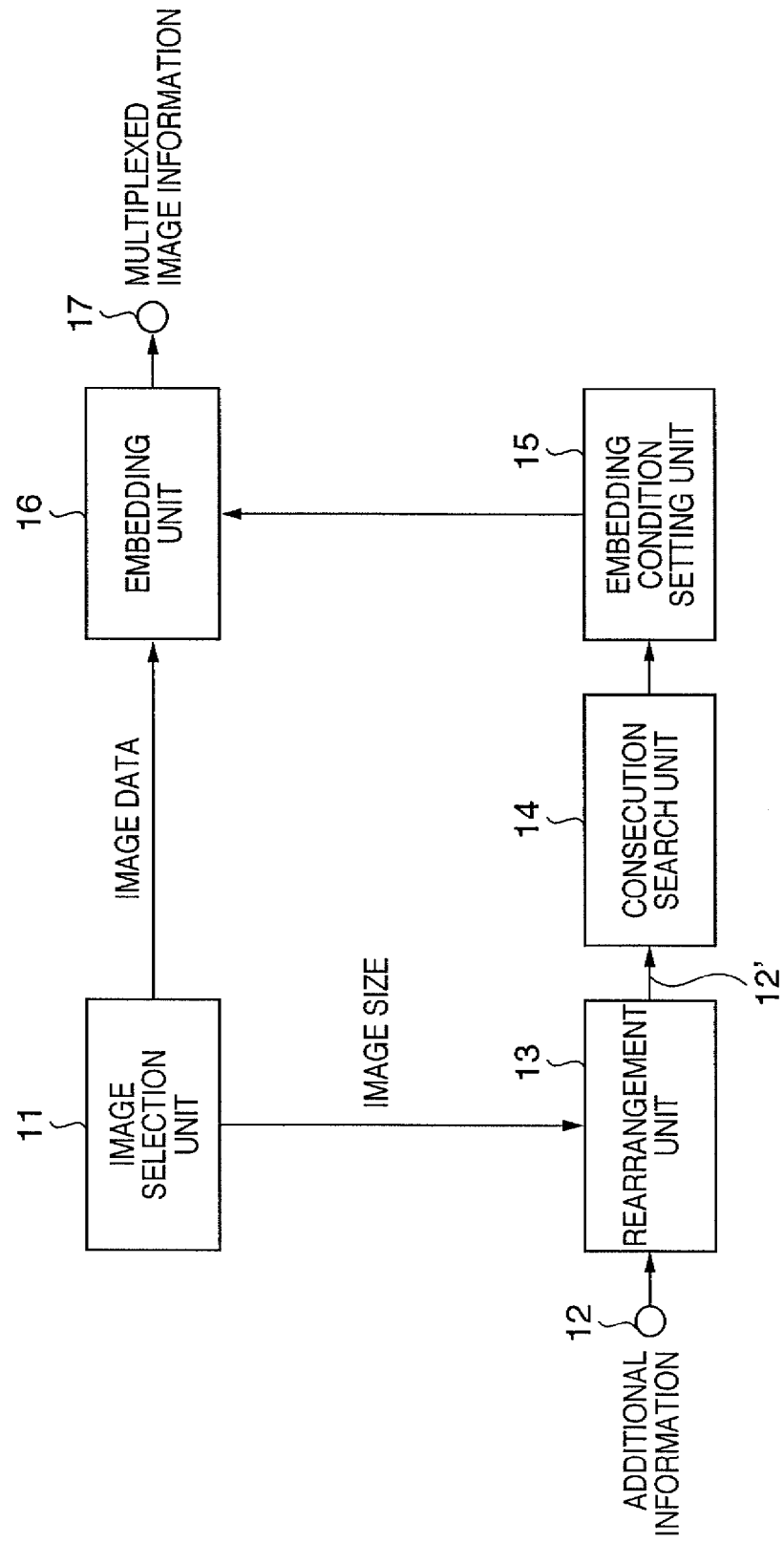
FIG. 1 is a block diagram showing the configuration of an information adding device according to a first embodiment.

FIG. 1 is a block diagram showing the configuration of the information adding device according to the first embodiment.

An image selection unit 11 selects an image in which additional information is to be embedded, outputs image size information to an additional information rearrangement unit 13, and outputs image data of the selected image to an additional information embedding unit 16.

Figure 2:
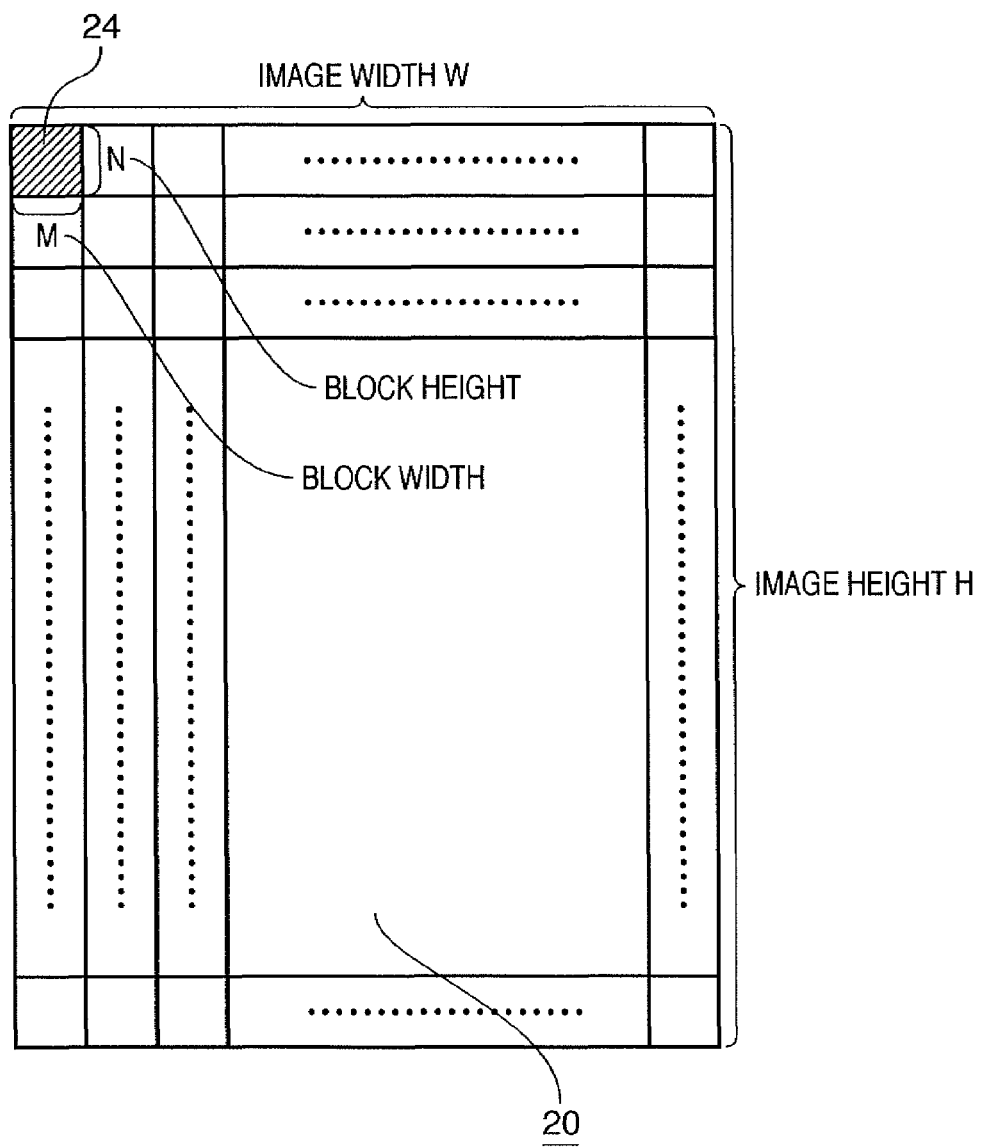
FIG. 2 is a table showing processing of dividing an image region into blocks upon embedding of additional information.

FIG. 2 is a table showing processing of dividing an image region into blocks upon embedding of additional information. In the following description, the additional information is embedded in the image region by arbitrary-sized block.

Figure 3:
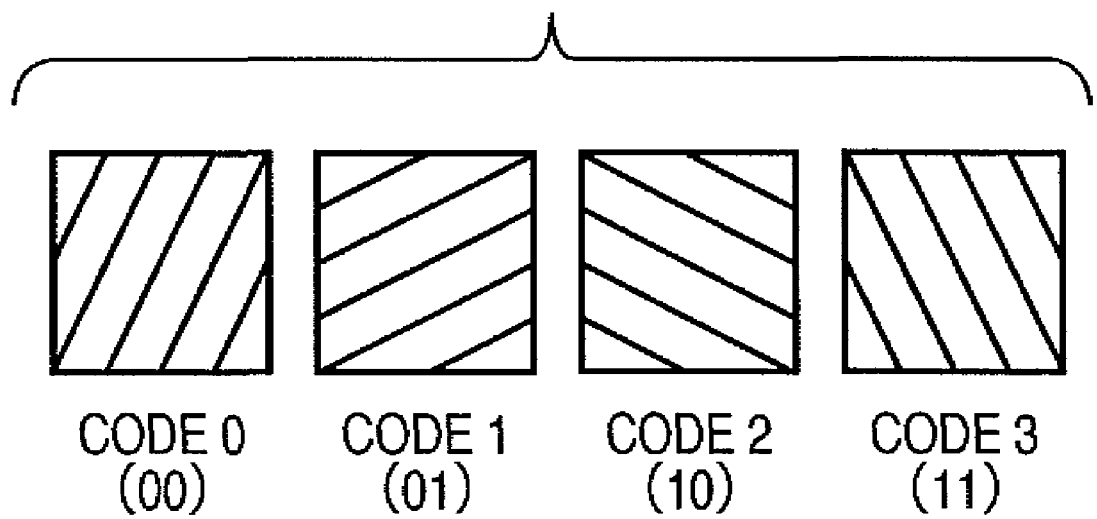
FIG. 3 shows an example of periodic patterns embedded into the block.

An image 20 selected by the image selection unit 11 has W-pixel image width and H-pixel image height as its image size. A block 24 in which the additional information is to be embedded has M-pixel width and N-pixel height as its size. Note that for the sake of simplification, M=N holds. A predetermined amount of image information of embeddable in one block. In this embodiment, one of four types of periodic patterns as shown in FIG. 3 is embedded in each block, thereby two-bit information is embedded in the block. Note that the embeddable amount of information in one block is not limited to two bits.

The rearrangement unit 13 rearranges input additional information 12 into a two-dimensional form. FIG. 4 is an explanatory view of the rearrangement of the additional information 12 into the two-dimensional from. In the image 20, a number P of blocks in a horizontal direction is calculated from the following expression (1).

$$P = int(W/N) \qquad (1)$$

where int X is a function to extract only an integer part of X.

The additional information 12 as a one-dimensional form (serial data) is rearranged by diving the additional information 12 by the number P of blocks in the horizontal direction. As a result, the positions of blocks in which the respective codes of the additional information 12 are embedded can be grasped, and a portion where the same code consecutively appears is controlled, thereby the degradation of image quality can be prevented. The rearrangement unit 13 outputs additional information 12' rearranged as the two-dimensional form to the consecution search unit 14.

The consecution search unit 14 searches for a portion where the same code consecutively appears from the additional information 12' rearranged as the two-dimensional form. FIGS. 5A to 5F are explanatory views of a consecution search procedure. In this embodiment, as a determination criterion of code consecution, when the same code consecutively appears for a predetermined number of codes in the vertical or horizontal direction, it is determined that code consecution occurs. In this embodiment, when the same code consecutively appears for three codes, it is determined that code consecution occurs, and a setting condition is changed in the central code position.

The consecution search unit 14 searches for code consecution from an upper left position (head code 51) of the additional information 12' in a rightward direction (FIG. 5A). Note that when the process reaches a right end of the additional information 12', the process moves to a lower line, and the search is restarted from a left end code. As shown in FIG. 5B, as the same code consecutively appears for three codes, it is determined that the code consecutively appears in this portion 52. Then as shown in FIG. 5C, the central code position of the code consecution portion 52 is set as a setting condition change position 53.

Next, the consecution search unit 14 searches for code consecution in the second and the subsequent rows. As shown in FIG. 5D, as the same code ("0") consecutively appears in the vertical direction, the consecution search unit 14 determines that code consecution occurs in this portion 54. Then, as shown in FIG. 5E, the central code position of the code consecution portion 54 is set as a setting condition change position 55.

The consecution search unit 14 performs the above searching processing on the entire additional information 12', and detects setting condition change positions as shown in FIG. 5F. The consecution search unit 14 outputs information indicating the setting condition change positions to an embedding condition setting unit 15.

The embedding condition setting unit 15 controls an embedding condition for the additional information 12' based on the result of consecution search, thereby sets the embedding condition by code of the additional information 12'. In this embodiment, the embedding condition is a pattern phase.

FIG. 6 shows two types of embedding conditions with different phases for respective codes. A condition A is a normal embedding condition, and a condition B with a pattern phase different from that of the condition A is applied to the setting condition change positions.

Figure 7:
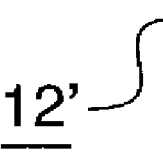
FIG. 7 is a matrix showing correspondence between the respective codes of the additional information and embedding conditions (multiplexing processing setting conditions)

FIG. 7 is a matrix showing correspondence between the respective codes of the additional information 12' and the embedding conditions (multiplexing processing setting conditions). As shown in FIG. 7, a code to be embedded to each block and the embedding condition are set as e.g. "3/A" (code "3" is embedded on the condition A) or "0/B" (code "0" is embedded on the condition B), from the result of consecution search. Note that the normal condition A is set for a code when the result of consecution search indicates that it is not a setting condition change position. The condition B is set for a code when the result of consecution search indicates that it is a setting condition change position.

The embedding condition setting unit 15 outputs the additional information 12' and code embedding conditions to the additional information embedding unit 16.

The embedding unit 16 embeds the additional information 12' in the image based on the embedding conditions. In this embodiment, the additional information is embedded in an image region of a printed matter by utilizing the error diffusion method. Note that as the error diffusion method is well known, the method will be briefly described.

In the embedding utilizing the error diffusion method, a quantization threshold value of the error diffusion method is periodically changed by image block. The periodicity is changed in correspondence with code of additional information, thereby a pattern which does not occur in normal error diffusion processing occurs by block. By this method, a large amount of information can be embedded in an image region.

The embedding unit 16 changes the phase of generated pattern in correspondence with embedding condition. As a result, embedding processing in consideration of consecution of additional information is performed, thereby the degradation of image quality due to code consecution can be suppressed.

The embedding unit 16 outputs multiplexed image information 17. When the multiplexed image information 17 is print-outputted on a print sheet by a printer or the like, a printed matter in which the additional information 12' is embedded is completed.

[Information Extracting Device]

Figure 8:
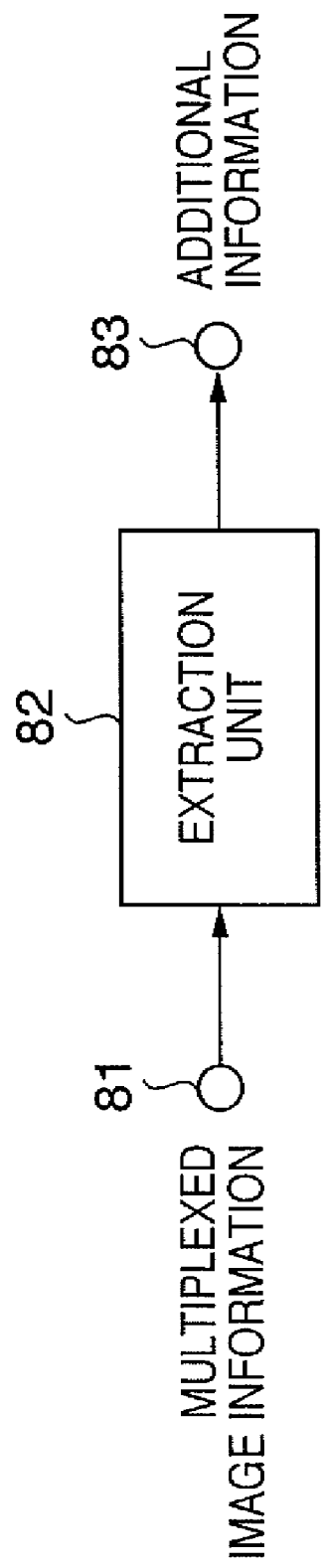
FIG. 8 is a block diagram showing the configuration of an information extracting device according to the first embodiment.

Next, extraction processing of extracting additional information embedded in image information will be described. FIG. 8 is a block diagram showing the configuration of the information extracting device according to the first embodiment.

An additional information extraction unit 82 inputs multiplexed image information 81, and outputs extracted additional information 83. The multiplexed image information 81 may be obtained from a network such as the Internet, or may be obtained by reading a printed matter in which additional information is embedded with an optical reading device such as a scanner. Further, the multiplexed image information 81 may be stored in various types of memories such as a hard disk. In the following description, in correspondence with the above-described additional information embedding processing, additional information extraction processing is performed on image data of a printed matter read with an optical reading device.

The extraction unit 82 divides an image region in which the additional information is embedded by M×N pixel block upon embedding of additional information, analyzes pattern periodicity by block, thereby separates the additional information. Note that the extraction processing is disclosed in Japanese Patent Application Laid-Open No. 2001-148778.

[Operation Procedure in Information Adding Device]

Figure 9:
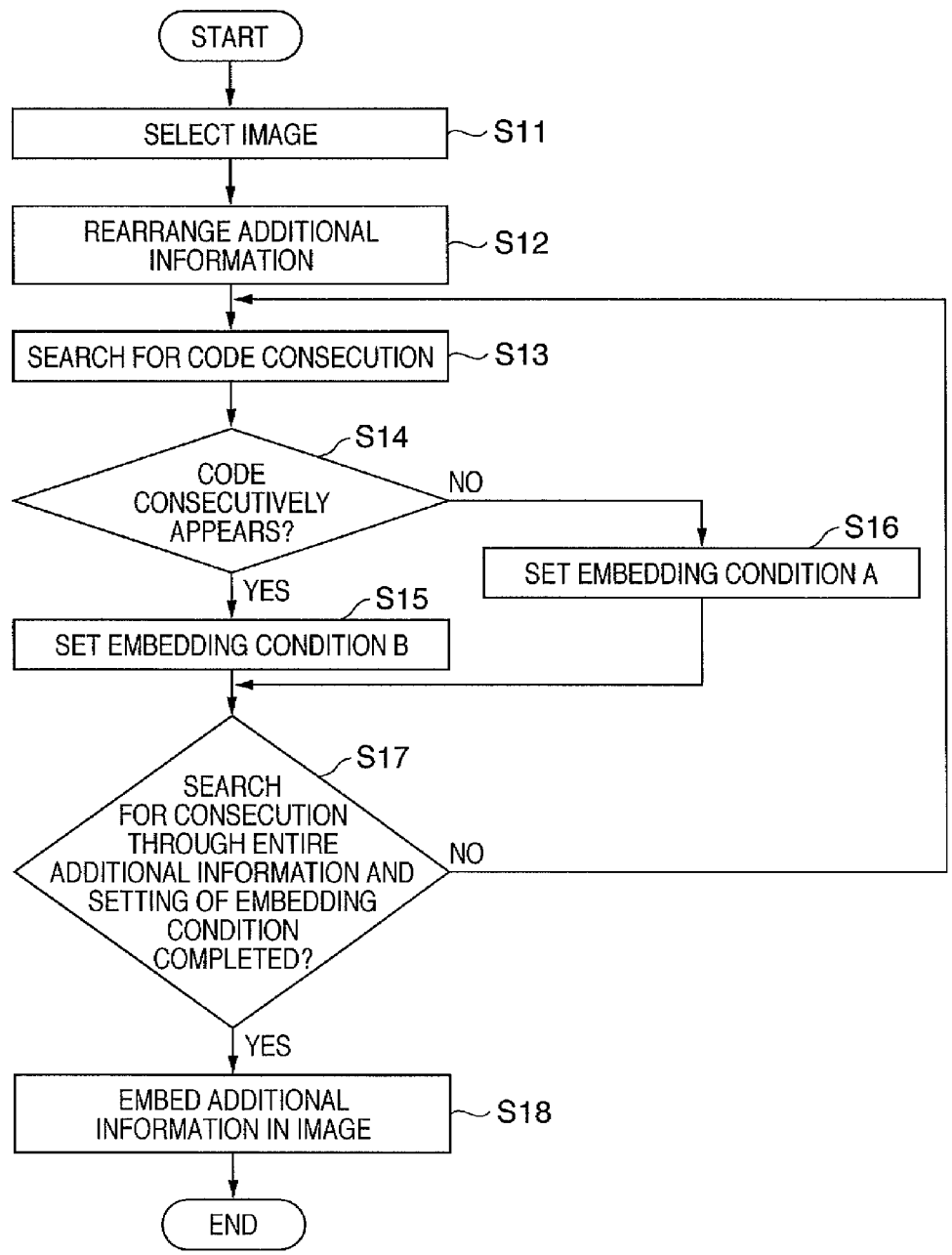
FIG. 9 is a flowchart showing an operation procedure in the information adding device.

FIG. 9 is a flowchart showing an operation procedure in the information adding device.

First, the image selection unit 11 selects an image in which additional information is to be embedded (S11). The rearrangement unit 13 inputs an image size of the selected image from the image selection unit 11, inputs the additional information 12 from the outside, and as shown in FIG. 4, rearranges the additional information 12 as the one-dimensional form (serial data) into the two-dimensional form (S12).

The consecution search unit 14 inputs the additional information 12' rearranged as the two-dimensional form, and searches for a portion where the same code consecutively appears based on the determination criterion of code consecution (S13). The embedding condition setting unit 15 determines whether or not the consecution search unit 14 has determined that code consecution occurs (S14). The embedding condition setting unit 15 sets the condition B as the embedding condition in a portion determined that the same code consecutively appears (S15), and sets the normal condition A in a portion determined that the same code does not consecutively appears (S16).

The embedding unit 16 determines whether or not the consecution search and embedding condition setting with respect to the entire additional information 12' have been completed (S17), thus waits for the completion of the consecution search and embedding condition setting with respect to the entire additional information 12'. When the processing from step S13 to S16 is repeated and the consecution search and embedding condition setting with respect to the entire additional information 12' have been completed, the embedding unit 16 embeds the additional information 12' in the image data inputted from the image selection unit 11 based on the set embedding conditions (S18).

[Operation Procedure in Information Extracting Device]

Figure 10:
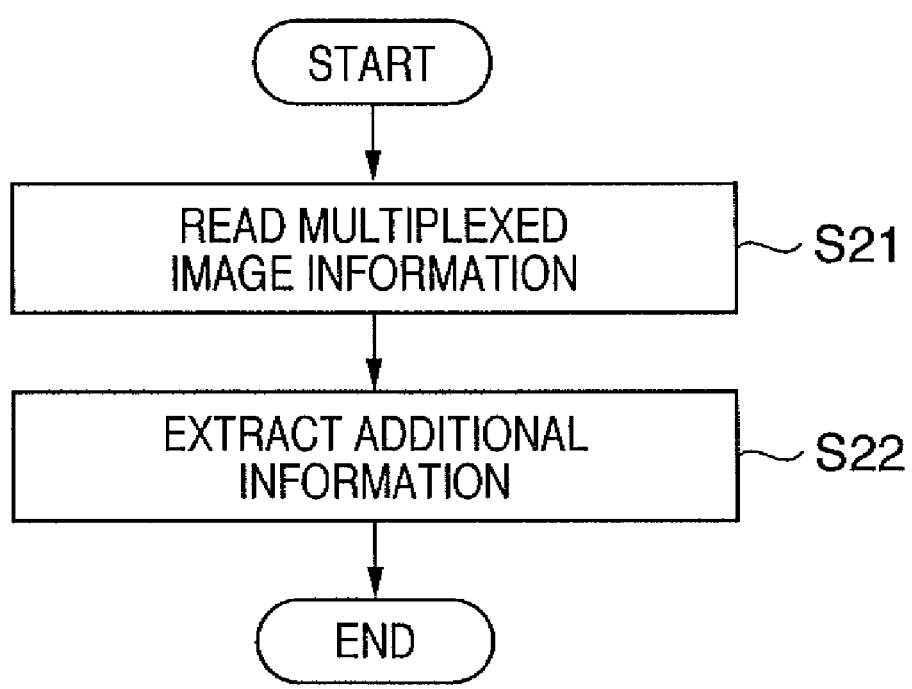
FIG. 10 is a flowchart showing an operation procedure in the information extracting device.

FIG. 10 is a flowchart showing an operation procedure in the information extracting device.

The extraction unit 82 reads the multiplexed image information 81 (S21), and extracts the additional information 83 from the input multiplexed image information 81 (S22).

[Effects of Embedding of the Additional Information in Consideration of Code Consecution]

Figures 11A, 11B:
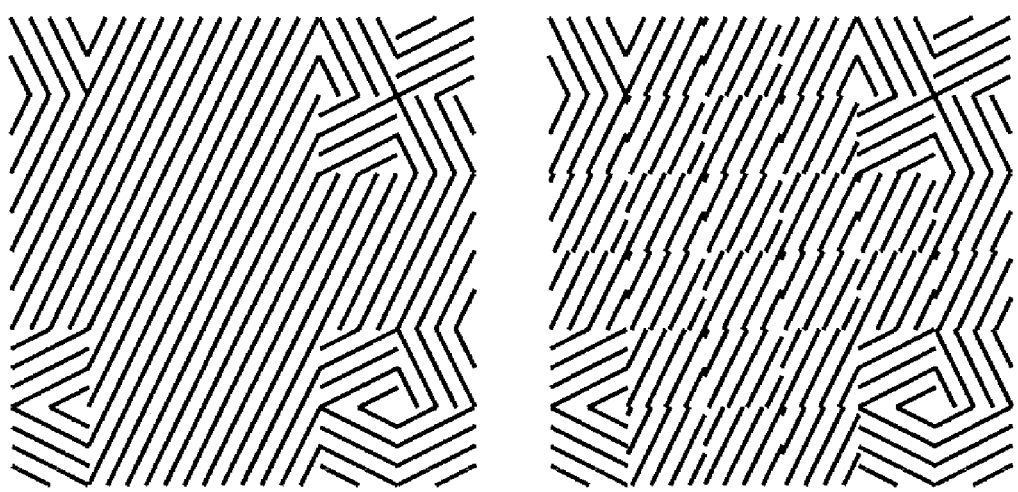
FIGS. 11A and 11B show effects of embedding of the additional information in consideration of code consecution.

FIGS. 11A and 11B show effects of embedding of the additional information in consideration of code consecution. FIG. 11A shows a case where code consecution is not taken into consideration. FIG. 11B shows a case where code consecution is taken into consideration. In FIG. 11A, as code consecution is not taken into consideration, pattern repetition is conspicuous due to pattern consecution. On the other hand, in FIG. 11B, as code consecution is taken into consideration, conspicuity of pattern repetition is suppressed in comparison with FIG. 11A.

In this manner, multiplexing processing on image and additional information in consideration of code consecution in the additional information can be realized. That is, the problem of pattern consecution due to code consecution, which causes conspicuous pattern repetition, and by extension, degrades the image quality, can be reduced by changing the condition for embedding the additional information in consideration of code consecution of the additional information. Further, the embedded additional information can be extracted in a stable manner.

Modifications of Embodiment

The embedding of additional information described in the present embodiment is merely an example. The present invention is applicable to other methods than the above-described method of dividing an image into blocks and embedding a pattern corresponding to a code by block as long as the condition for embedding the additional information is changed in consideration of code consecution of the additional information.

Further, the extraction of additional information can be performed by utilizing well-known extraction methods such as frequency analysis by discrete Fourier transformation.

Further, the consecution searching and embedding condition changing processing are not limited to those described in FIGS. 5A to 5F. Regarding the range of consecution search, the determination criterion of code consecution, the embedding condition changing, various methods as follows are available.

In the present embodiment, the determination criterion of code consecution is consecutive appearance of same code for three codes. However, the number of consecutive appearance of same code may be four or more. Further, the direction of consecution determination is not limited to the horizontal and vertical directions. The consecution determination may be performed in diagonal directions.

Further, in the present embodiment, as the range of consecution search, the search is made by line in horizontal and vertical directions. However, the consecution determination may be made by a predetermined area.

Further, the determination criterion of code consecution is not limited to consecutive appearance of same code for a predetermined number, but may be regular appearance of code. FIGS. 12A to 12D are explanatory views of an example of a search in which regular appearance of code is determined as code consecution.

In FIG. 12A, the consecution search unit 14 determines the appearance of codes (pattern) "2, 1, 2, 1, 2" in the additional information 12' as code consecution. In FIG. 12B, the consecution search unit 14 determines a portion 92 having the code pattern "2, 1, 2, 1, 2" as code consecution. Then, as shown in FIG. 12C, the consecution search unit 14 sets a code position in the code consecution portion 92 as a setting condition change position 93.

Next, the consecution search unit 14 searches for code consecution from the third and the subsequent lines. As shown in FIG. 12D, the consecution search unit 14 sets a code position in a code consecution portion as a setting condition change position 94.

As shown in FIGS. 12A to 12D, the determination of code array by pattern matching, in place of determination of consecutive appearance of same code, is advantageous in suppression of degradation of image quality such as moiré caused in particular code pattern.

Further, the setting condition change position is not limited to the center of a range determined as consecution, but may be any position within the range. Further, the setting condition change position may be sequentially shifted. For example, in a case where horizontal consecutive appearance of same code for three codes is determined as code consecution, when three consecution portions are found, the setting condition change position is set in the left end of the first consecution, then in the central position of the second consecution, and in the right end of the third consecution. Otherwise, the setting condition change position may be set at random within the range of consecution. Note that the number of setting condition change positions is not limited to one, but may be plural or random.

In the present embodiment, the two types of embedding conditions, the condition A and the condition B, are prepared, however, three or more embedding conditions may be employed. In such case, the prepared three or more embedding conditions may be applied sequentially or at random.

In the present embodiment, the phase of a pattern to be embedded is changed as changing of embedding condition, however, as in the following example, a setting item may be changed in correspondence with embedding processing.

For example, when additional information is embedded in a particular color component of an RGB image by utilizing the density pattern method or pixel substitution method, the additional information may be embedded in a G plane as normal embedding and may be embedded in a B plane on an embedding condition selected in correspondence with code consecution. Note that the number of colors (planes) used in the normal embedding condition and embedding condition selected in correspondence with code consecution may be two or more.

In a printer or the like, when a pattern is embedded in correspondence with color material, additional information may be embedded in a yellow plane as normal embedding, but in a light cyan plane as embedding on an embedding condition selected in correspondence with code consecution. In this case, the color material upon normal embedding and that on the embedding condition selected in correspondence with code consecution may be arbitrarily selected. Further, the number of colors used in the normal embedding condition and embedding condition selected due to code consecution may be two or more.

When additional information is embedded using the density pattern method, regarding a code block as a list of combinations of particular luminance levels and embedded codes, a code book used in normal embedding and a code book used on an embedding condition selected in correspondence with code consecution may be prepared. Note that it may be arranged such that a normal pattern and a change pattern are prepared in a code book, and one of the patterns is selected in accordance with code consecution.

Further, additional information may be embedded by changing a DCT coefficient in a particular frequency after discrete cosine transformation in correspondence with additional information. In this case, a DCT coefficient changed in normal embedding and a DCT coefficient changed in correspondence with code consecution are previously set, and a DCT coefficient change position is changed in correspondence with code consecution. Further, any other frequency transformation than the discrete cosine transformation such as wavelet transformation or Hadamard transformation may be employed.

Further, additional information may be embedded by utilizing the ordered dither method. In this case, a dither matrix is changed in correspondence with code. An ordered dither matrices (A and B) used in normal embedding and an ordered dither matrices (C and D) used in correspondence with code consecution are prepared. Then an ordered dither matrix is changed in correspondence with code consecution. The used dither matrix is held as a private key.

Further, when a coefficient in a low-correlation dither matrix is changed in correspondence with code to be embedded by utilizing the ordered dither method, the change position may be changed in correspondence with code consecution.

As a method utilizing pixel substation, additional information may be substituted with a bit or bit stream on a particular bit plane. In this case, a bit plane, bit or bit stream to be substituted in correspondence with consecution of additional information may be changed. For example, when an eight gray-level image is used, a code is embedded in one plane on a normal embedding condition, and a code is embedded in three planes on an embedding condition selected in correspondence with code consecution. Thus the embedding condition is changed in correspondence with code consecution.

Further, in a method utilizing the pixel substitution, when additional information is embedded by patchwork method, a variance value shift amount by block may be changed in correspondence with code consecution. For example, assuming that a disperse shift amount used on normal embedding condition is S, the embedding condition can be changed in correspondence with code consecution by setting the shift amount to S/2 on an embedding condition used in correspondence with code consecution.

Further, additional information may be embedded in a printed matter by periodically changing a quantization threshold value in error diffusion. In this case, the fluctuation margin of quantization threshold value used on a normal embedding condition and the fluctuation margin of quantization threshold value used on embedding condition selected in correspondence with code consecution are prepared, and a fluctuation margin may be changed in correspondence with code consecution. For example, the fluctuation margin on the embedding condition changed in correspondence with code consecution is set to the half of that on the normal embedding condition.

Further, in the present embodiment, the number of changed items is one item related to pattern phase, however, plural types of setting conditions may be changed in correspondence with code consecution using combinations of other change items (plural types).

Second Embodiment

Hereinbelow, the image processing according to a second embodiment of the present invention will be described. Note that in the second embodiment, constituent elements corresponding to those in the first embodiment have the same reference numerals and detailed explanations of the elements will be omitted.

In the first embodiment, code consecution in additional information is determined and the setting condition of multiplexing processing is changed. In the second embodiment, code consecution in additional information is determined and a code is inserted/changed thereby degradation of image quality due to code consecution is avoided.

[Information Adding Device]

Figure 13:
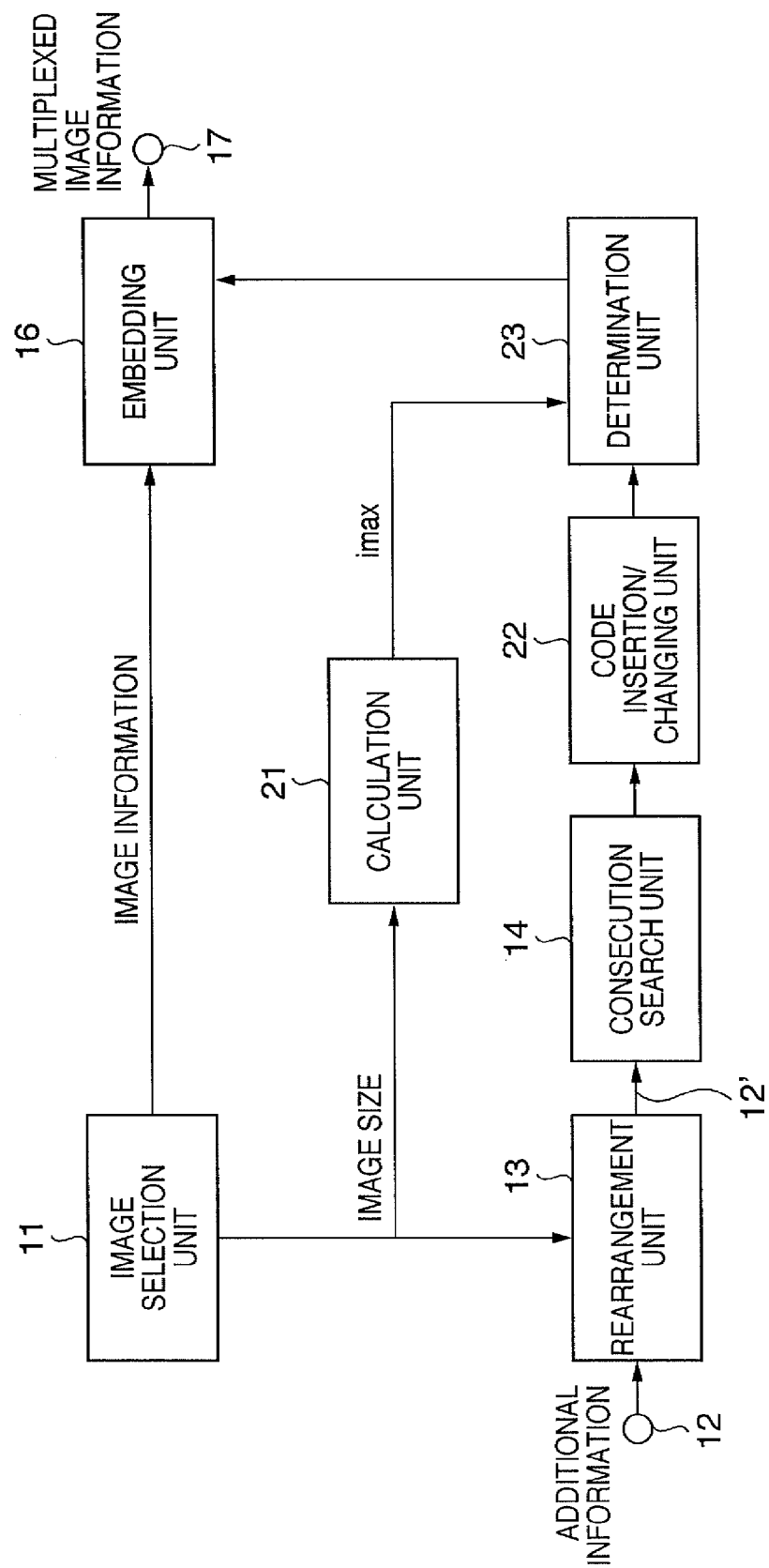
FIG. 13 is a block diagram showing the configuration of the information adding device according to a second embodiment.

FIG. 13 is a block diagram showing the configuration of the information adding device according to the second embodiment.

An embeddable information amount calculation unit 21 calculates a maximum embeddable amount of additional information in a selected image based on an image size inputted from the image selection unit 11, and outputs the calculated information amount imax to a determination unit 23.

As shown in FIG. 13, the information amount imax indicating the amount of additional information embeddable in the image can be calculated with the following expression as long as the size of the image W×H in which the additional information is to be embedded and the size of block M×N are determined. As a pattern to be embedded in each block, one of four periodic patterns as shown in FIG. 3 are used. Accordingly, the calculation of the embeddable information amount imax is to double the number of image blocks.

$$i\max=(W/M)\times(H/N)\times2\text{(bits)} \quad (2)$$

A code insertion/changing unit 22 inserts or changes a code when the code consecutively appears based on the search result by the consecution search unit 14, thereby controls the additional information 12' and breaks code consecution. In the present embodiment, for the sake of convenience of explanation, the code insertion/changing unit 22 inserts a code when the code consecutively appears in the horizontal direction, while changes a code when the code consecutively appears in the vertical direction. Note that when a code consecutively appears in the horizontal and vertical directions, priority is given to the control in the vertical direction.

FIG. 14 shows an example of the relation between pre-change and post-change of codes and the embedded pattern upon code change. A code change position is set in the central position of consecutive appearance of same code for three codes.

Further, when a code is inserted, consecutive appearance of same code and an inserted code are brought into correspondence. When a code "0" consecutively appears for three codes in the horizontal direction, a code "1" is inserted. When a code "1" consecutively appears for three codes in the horizontal direction, a code "0" is inserted. When a code "2" consecutively appears for three codes in the horizontal direction, a code "3" is inserted. When a code "3" consecutively appears for three codes in the horizontal direction, a code "2" is inserted. The code insertion is performed in a position between the second and third codes from the head of code consecution. For example, in code consecution "000", a code "1" is inserted between the second and third "0", then the result of insertion is "0010".

Note that a code, changed from one type of pre-change code, may correspond to plural types. Further, the number of inserted codes is not limited to one. Further, an inserted code may be newly generated code in place of a code used in the additional information. Further, the code insertion may be performed not only in one position but in plural positions. Further, the code insertion may be performed in other position than the above-described position.

FIGS. 15A to 15F are explanatory views of the consecution search procedure and the code insertion/change. In the present embodiment, when the same code consecutively appears for three codes in the vertical or horizontal direction, it is determined that code consecution occurs in the portion, and a code is inserted or changed.

The consecution search unit 14 searches for code consecution from an upper left position (head code 141) of the additional information 12' in a rightward direction (FIG. 15A). As shown in FIG. 15B, as the same code ("0") consecutively appears for three codes in the horizontal direction in the second line, the consecution search unit 14 determines that code consecution occurs in this portion 142.

As shown in FIG. 15C, the code insertion/changing unit 22 inserts a code "1" in an insertion position 143. Note that the code array of the additional information 12' is shifted by the insertion of the code. Then, by the code insertion, the pattern to be embedded is incremented by 1 block and the amount of embedded additional information is incremented by 2 bits. At this time, a total information amount ie of the embedded additional information is obtained with the following expression.

$$ie=i+2\text{(bits)} \quad (3)$$

where i is amount of additional information before code insertion.

Next, as the same code ("0") consecutively appears for three codes in the vertical direction from the fourth line to the sixth line of the additional information 12', the consecution search unit 14 determines code consecution occurs in this portion 144.

As shown in FIG. 15E, the code insertion/changing unit 22 changes the code in a change position 145 from "0" to "4".

As shown in FIG. 15F, the consecution search unit 14 performs the above searching processing on the entire additional information 12' and detects the code insertion and change positions. The code insertion/changing unit 22 performs code insertion or change based on the search result by the consecution search unit 14. In this manner, when the same code consecutively appears in the horizontal direction, a code is inserted, and when the same code consecutively appears in the vertical direction, a code is changed, thereby code consecution is broken. When codes for K blocks have been inserted, the total information amount ie of the additional information is obtained with the following expression.

$$ie=i+2\times K\text{(bits)} \quad (4)$$

The determination unit 23 determines whether or not the additional information with inserted code(s) can be embedded in the image. That is, the determination unit 23 compares the embeddable information amount imax calculated by the calculation unit 21 with the total information amount ie of the additional information after the consecution search, and determines whether or not the additional information, with code(s) inserted to break code consecution, can be embedded in the image. When the result of comparison between the embeddable information amount imax and the total information amount ie of the additional information satisfies the following expression, the additional information can be embedded.

$$ie\leq i\max \quad (5)$$

When the result of comparison satisfies the expression (5), the determination unit 23 outputs the additional information to the embedding unit 16. When the result of comparison does not satisfy the expression (5), all the additional information cannot be embedded in the image. In this case, the determination unit 23 notifies the consecution search unit 14 of the failure of embedding.

When it is determined that the additional information cannot be embedded in the image, the consecution search unit 14 changes the determination criterion of code consecution, and again searches for code consecution. For example, as the changed determination criterion of code consecution, when the same code consecutively appears for five codes, it is determined that code consecution occurs in that portion. In comparison with the previous criterion for determination of code consecution made when the same code consecutively appears for three codes, the number or code insertion positions is reduced, and the probability of embedding of all the additional information in the image can be higher. In other words, appropriate embedding processing in consideration of code consecution can be performed by changing (mitigating) the consecution determination criterion until all the additional information can be embedded in the image.

[Information Extracting Device]

Figure 16:
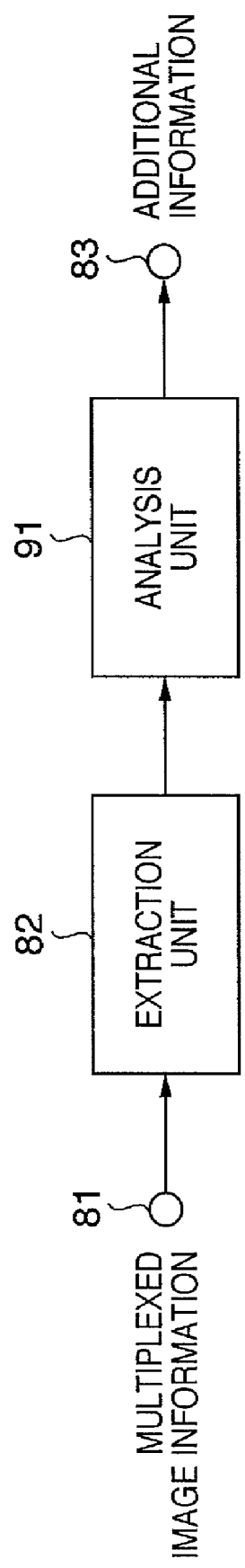
FIG. 16 is a block diagram showing the configuration of the information extracting device according to the second embodiment.

Next, extraction processing of extracting additional information embedded in image information will be described. FIG. 16 is a block diagram showing the configuration of the information extracting device according to the second embodiment.

As in the case of the first embodiment, the additional information extraction unit 82 inputs the multiplexed image information 81, and outputs the extracted additional information 83. However, the additional information outputted from the extraction unit 82 includes codes inserted or changed so as to break consecution upon additional information embedding processing. Accordingly, it is necessary to delete the inserted codes and restore the changed codes to pre-change codes.

An additional information analysis unit 91 deletes the codes inserted upon additional information embedding processing from the additional information extracted by the extraction unit 82, and restores the changed codes to pre-change codes.

Figure 17:
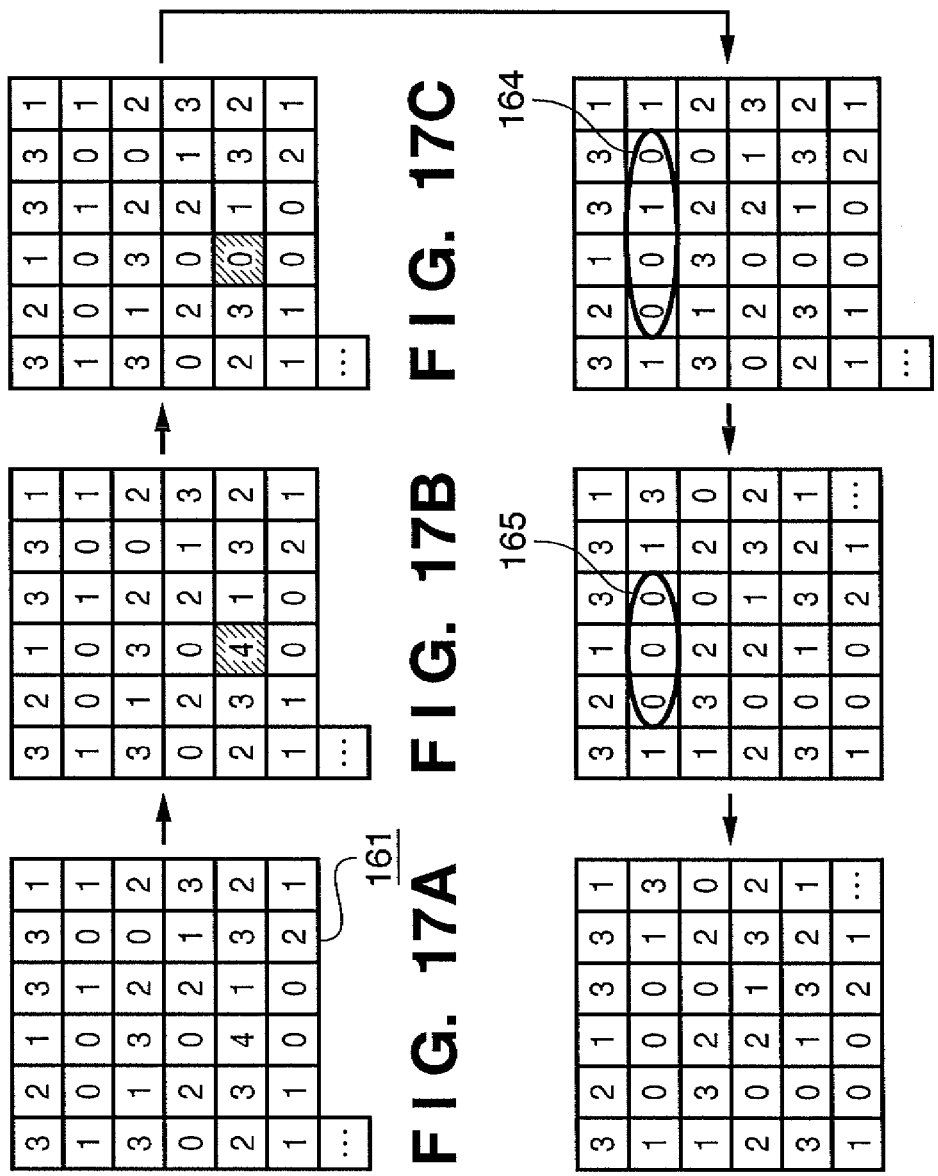
FIGS. 17A to 17F are explanatory views of processing by additional information analysis unit.

FIGS. 17A to 17F are explanatory views of processing by the additional information analysis unit 91. In FIG. 17A, additional information 161 is obtained by rearranging the additional information extracted by the extraction unit 82 into the two-dimensional form in correspondence with extraction positions from the image. The analysis unit 91 performs analysis based on the additional information 161.

The analysis unit 91 searches for an inserted code and a changed code, from a lower right position (end code) of the additional information 161 in a leftward direction. Note that when the process reaches a left end of the additional information 161, the process moves to an upper line, and the search is restarted from a right end code in the leftward direction.

The search for inserted codes can be made from the above-described regularity of code insertion. Further, the search for changed codes can be made from the relation shown in FIG. 14. That is, regarding an inserted code, an inserted code "1" always appears in a pattern "0100" from the analysis direction; an inserted code "0" always appears in a pattern "1011" from the analysis direction; an inserted code "2" always appears in a pattern "3233" from the analysis direction; and an inserted code "3" always appears in a pattern "2322" from the analysis direction. Further, the positions of changed codes corresponds to the appearance positions of codes "4", "5", "6" and "7".

As shown in FIG. 17B, when the analysis unit 91 finds a code "4", the analysis unit 91 restores the code "4" to "0" as shown in FIG. 17C in accordance with the correspondence table shown in FIG. 14. Next, as shown in FIG. 17D, when a "0100" pattern 164 appears from the analysis direction, the analysis unit 91 rewrites the pattern to a pattern 165 from which the code "1" is deleted as shown in FIG. 17E.

In this manner, the analysis unit 91 analyzes the additional information extracted by the extraction unit 82, and deletes the inserted codes and restores pre-change codes, thereby restores the original additional information 83 before embedding in the image as shown in FIG. 17F.

[Operation Procedure in Information Adding Device]

Figure 18:
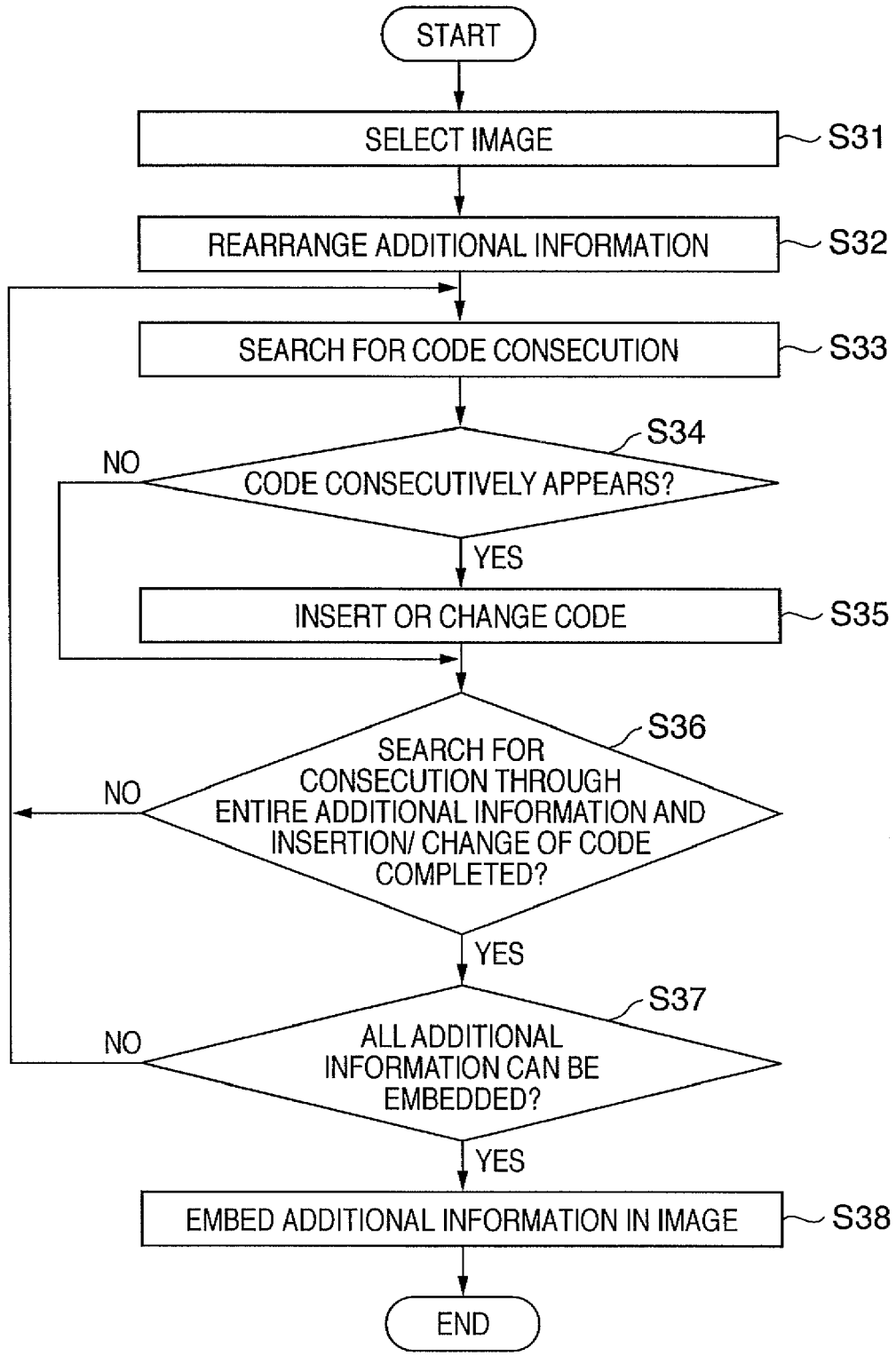
FIG. 18 is a flowchart showing the operation procedure in the information adding device.

FIG. 18 is a flowchart showing the operation procedure in the information adding device.

First, the image selection unit 11 selects an image in which additional information is to be embedded (S31). The rearrangement unit 13 inputs an image size of the selected image from the image selection unit 11, inputs the additional information 12 from the outside, and as shown in FIG. 4, rearranges the additional information 12 as the one-dimensional form (serial data) into the two-dimensional form (S32).

The consecution search unit 14 inputs the additional information 12' rearranged as the two-dimensional form, and searches for a portion where the same code consecutively appears based on the determination criterion of code consecution (S33). The code insertion/changing unit 22 determines whether or not the consecution search unit 14 has determined that code consecution occurs in the portion (S34). The code insertion/changing unit 22 performs code insertion in a portion where the same code consecutively appears in the horizontal direction, and performs code change in a portion where the same code consecutively appears in the vertical direction (S35).

The determination unit 23 determines whether or not the consecution search and the code insertion/change with respect to the entire additional information 12' have been completed (S36), thus waits for the completion of the consecution search and the code insertion/change with respect to the entire additional information 12'. When the processing from step S33 to S36 is repeated and the consecution search and the code insertion/change with respect to the entire additional information 12' have been completed, the determination unit 23 determines whether or not all the additional information can be embedded (S37). That is, the determination unit 23 calculates the total amount ie of the additional information from the number of codes inserted by the code insertion/changing unit 22, and compares the total information amount ie with the information amount imax calculated by the calculation unit 21, thereby determines whether or not all the additional information can be embedded.

When the determination unit 23 determines that all the additional information cannot be embedded, the determination unit 23 notifies the consecution search unit 14 of failure of embedding. Accordingly, the process returns to step S33. On the other hand, when the determination unit 23 determines that all the additional information can be embedded, the embedding unit 16 embeds the additional information 12' in the image data inputted from the image selection unit 11 (S38).

[Operation Procedure in Information Extracting Device]

Figure 19:
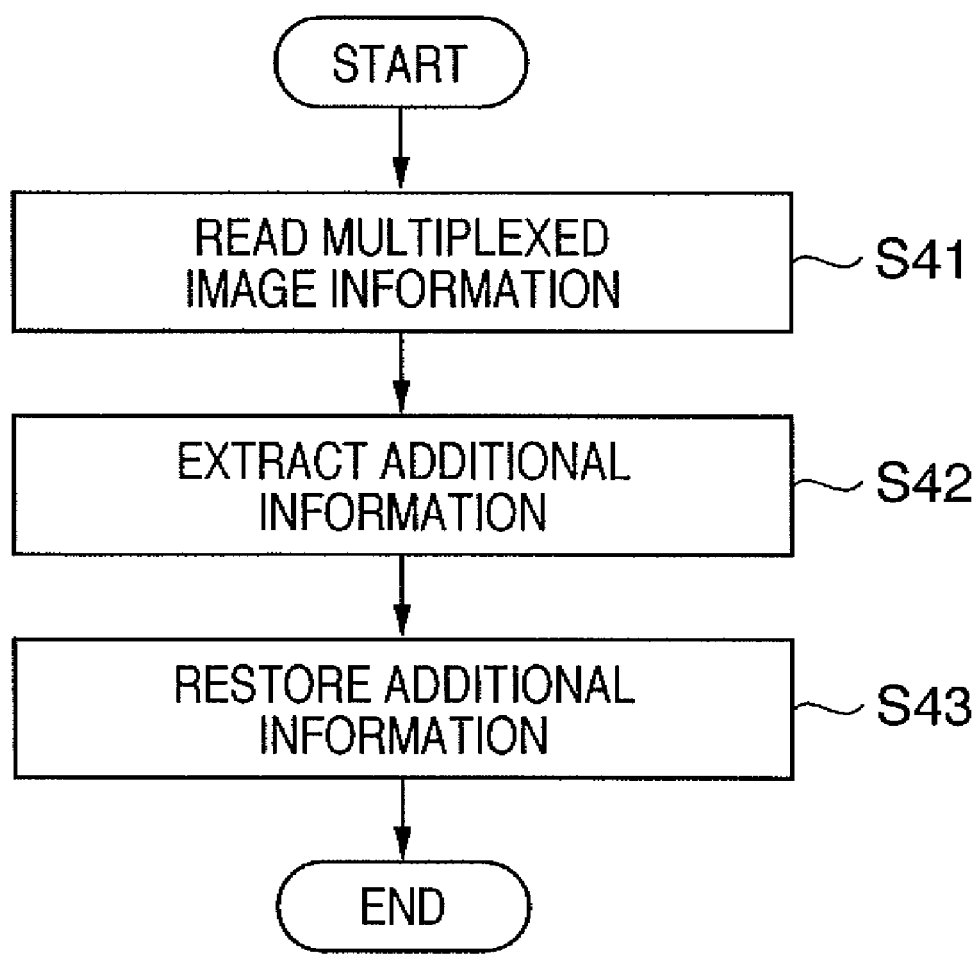
FIG. 19 is a flowchart showing the operation procedure in the information extracting device.

FIG. 19 is a flowchart showing the operation procedure in the information extracting device.

The extraction unit 82 reads the multiplexed image information 81 (S41), and extracts the additional information 83 from the input multiplexed image information 81 (S42). The analysis unit 91 deletes the inserted codes from the additional information extracted by the extraction unit 82, and restores pre-changed codes (S43).

[Effects of Embedding of the Additional Information in Consideration of Code Consecution]

FIGS. 20A and 20B show effects of embedding of the additional information in consideration of code consecution. FIG. 20A shows a case where code consecution is not taken into consideration. FIG. 20B shows a case where code consecution is taken into consideration. In FIG. 20A, as code consecution is not taken into consideration, pattern repetition is conspicuous due to pattern consecution. On the other hand, in FIG. 20B, as code consecution is taken into consideration, conspicuity of pattern repetition is suppressed in comparison with FIG. 20A.

In this manner, multiplexing processing on image and additional information in consideration of code consecution in the additional information can be realized. That is, the problem of pattern consecution due to code consecution, which causes conspicuous pattern repetition, and by extension, degrades the image quality, can be reduced by, when the same code consecutively appears, inserting/changing a code so as to break the consecution.

Note that in the present embodiment, when the same code consecutively appears, a code is inserted/changed so as to break the code consecution, however, the code consecution may be broken by one of code insertion and code change.

Further, in the present embodiment, the additional information is embedded by utilizing the error diffusion method, however, the additional information may be embedded in the image by well-known method such as the density pattern method or the pixel substitution method as described in the first embodiment. Further, the additional information may be extracted by an appropriate extraction method corresponding to the embedding method.

Third Embodiment

Hereinbelow, the image processing according to a third embodiment of the present invention will be described. Note that in the third embodiment, constituent elements corresponding to those in the first and second embodiments have the same reference numerals and detailed explanations of the elements will be omitted.

In the first embodiment, only code consecution in additional information is determined and the code embedding condition is changed. In the third embodiment, the determination criterion of code consecution is controlled in correspondence with image characteristic, and code consecution is determined based on the determination criterion of code consecution and the code embedding condition is controlled.

[Information Adding Device]

Figure 21:
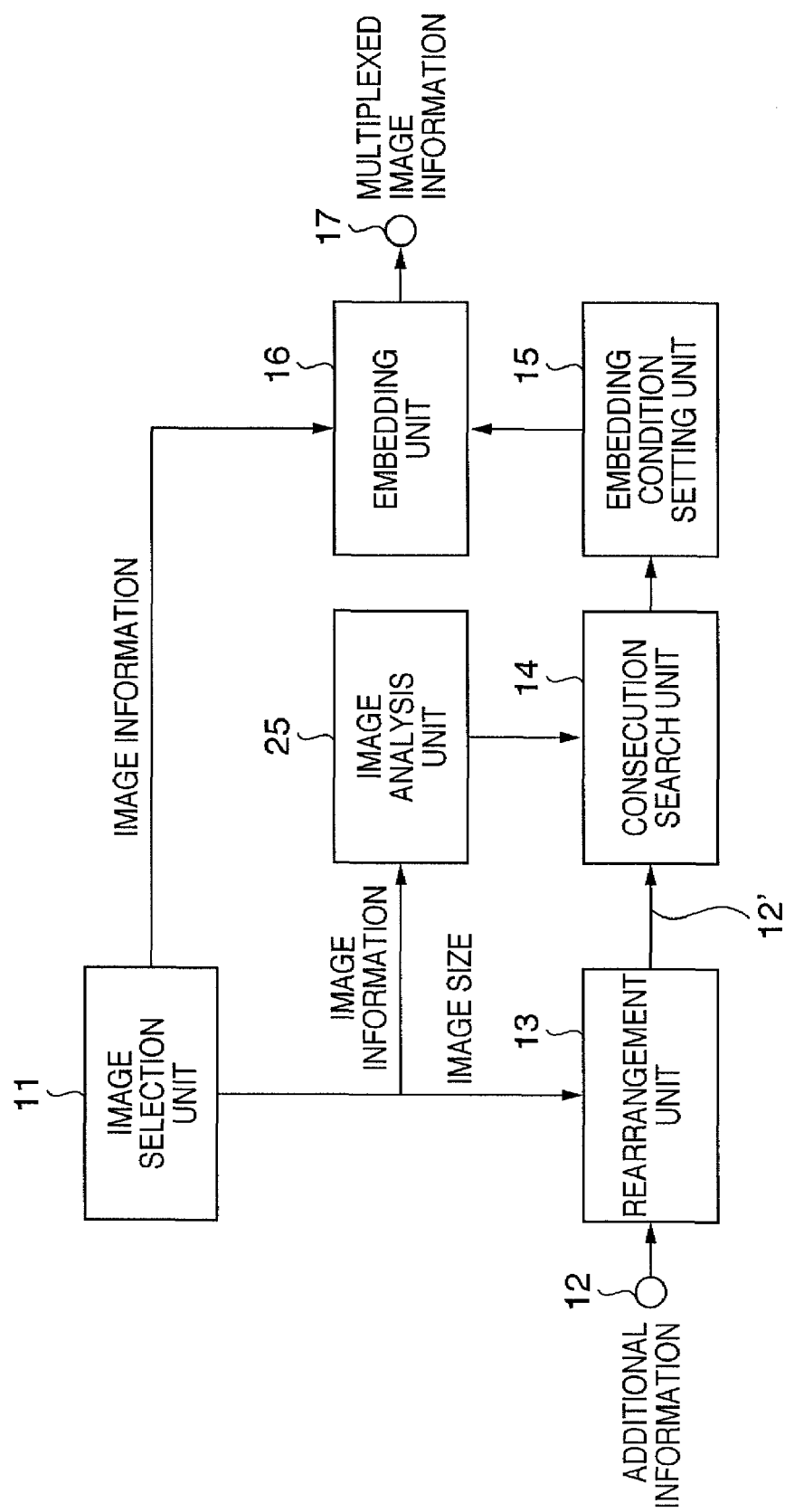
FIG. 21 is a block diagram showing the configuration of the information adding device according to a third embodiment.

FIG. 21 is a block diagram showing the configuration of the information adding device according to a third embodiment.

An image analysis unit 25 analyzes the characteristic of an image in which additional information is to be embedded from image information inputted from the image selection unit 11, and supplies the result of analysis to the consecution search unit 14. In the present embodiment, the image analysis unit 25 generates a luminance histogram of the image selected by the image selection unit 11 and analyzes luminance distribution of the image.

Figure 22:
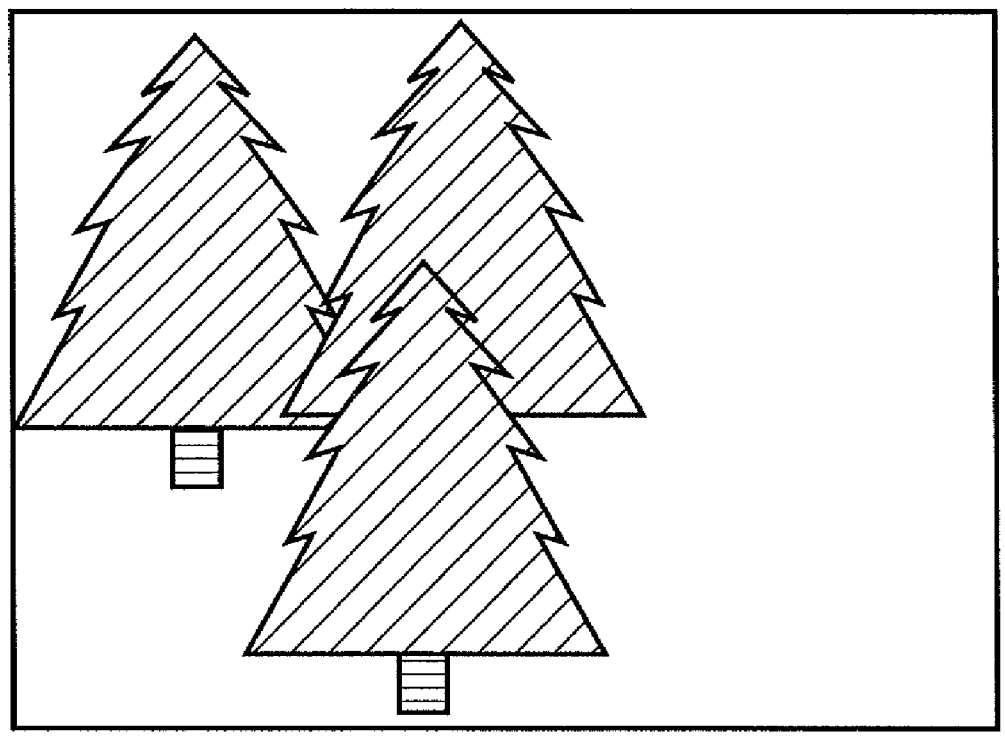
FIG. 22 is an example of an image selected by an image selection unit.
Figure 23:
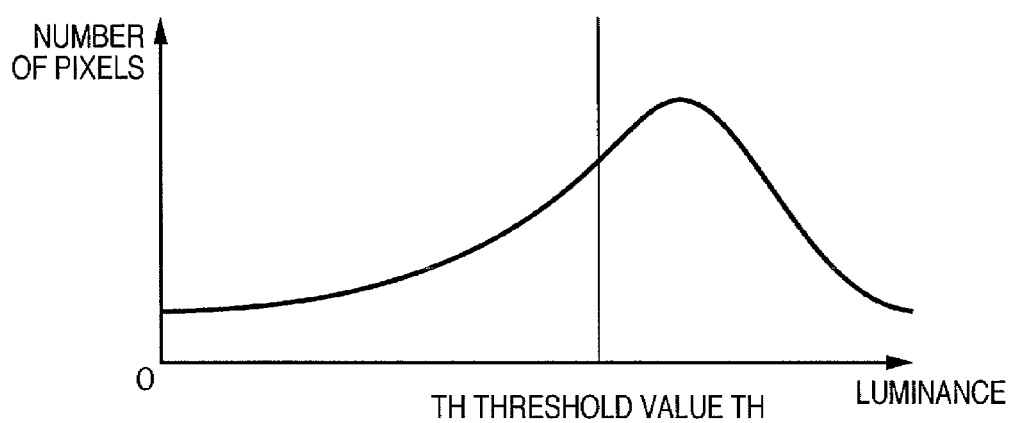
FIG. 23 is an example of a luminance histogram obtained from image information of the image shown in FIG. 22.

FIG. 22 is an example of the image selected by the image selection unit 11. FIG. 23 is an example of the luminance histogram obtained from image information of the image shown in FIG. 22. Note that in the luminance histogram shown in FIG. 23, the horizontal axis represents luminance, and the vertical axis, the number of pixels. A threshold value TH is a luminance value for equally dividing the area of the histogram into a high luminance side and a low luminance side.

The image analysis unit 25 compares a mean value of pixel values in each block with the threshold value TH of the entire image, thereby analyzes the characteristic of the block. That is, by each block, the image analysis unit 25 notifies the result of analysis indicating the mean value of pixel values in the block is higher/lower than the threshold value TH, to the consecution search unit 14.

FIGS. 24A to 24I are explanatory views of processing by the consecution search unit 14 (consecution search procedure). The consecution search unit 14 controls the determination criterion of code consecution in correspondence with the result of analysis (the characteristic of the image) inputted from the image analysis unit 25, thereby sets the determination criterion of code consecution. Then the consecution search unit 14 determines code consecution based on the set determination criterion of code consecution, and sets a code embedding condition change position.

The consecution search unit 14 inputs the additional information 12' shown in FIG. 24A. Then, as shown in FIG. 24B, links the analysis result by the image analysis unit 25 to the additional information 12'. In FIG. 24B, pixel mean value≦threshold value TH (dense region) holds on the left side from the center, and pixel mean value≧threshold value TH (sparse region) holds on the right side from the center.

In the present embodiment, in the dense region, when the same code consecutively appears for three codes in the horizontal or vertical direction, it is determined that code consecution occurs in the portion, and the embedding condition change position is set in the center of the consecutive three codes. Further, in the sparse region, when the same code consecutively appears for five codes in the horizontal or vertical direction, it is determined that code consecution occurs in the portion, and the embedding condition change position is set in the center of the consecutive five codes. In the dense region, pattern consecution is more conspicuous in comparison with the sparse region. Accordingly, the determination criterion of code consecution in the dense region is higher than that in the sparse region. As a result, the changing of the embedding condition in a code consecution portion is complicated, and the degradation of image quality due to code consecution can be suppressed.

The consecution search unit 14 searches for code consecution from an upper left position (head code 231) of the additional information 12' in a rightward direction (FIG. 24C). Note that when the process reaches a right end of the additional information 12', the process moves to a lower line, and the search is restarted from a left end code. As shown in FIG. 24C, in the dense region, as the same code ("0") consecutively appears for three codes in the horizontal direction, the consecution search unit 14 determines that code consecution occurs in this portion 233. Then, as shown in FIG. 24D, the consecution search unit 14 sets the central code position of the code consecution portion 233 as a setting condition change position 234.

Next, the consecution search unit 14 searches for code consecution in the third and fourth lines of the additional information 12'. As shown in FIG. 24E, in the dense region, when the same code ("0") consecutively appears for three codes in the vertical direction, the consecution search unit 14 determines that code consecution occurs in this portion 235. Then as shown in FIG. 24F, the consecution search unit 14 sets the central code position of the code consecution portion 235 as a setting condition change position 236.

Next, the consecution search unit 14 searches for code consecution in the fifth line of the additional information 12'. As shown in FIG. 24G, in the sparse region, when the same code ("0") consecutively appears for five codes in the vertical direction, the consecution search unit 14 determines that code consecution occurs in this portion 237. Then, as shown in FIG. 24H, the consecution search unit 14 sets the central code position of the code consecution portion 237 as a setting condition change position 238.

The consecution search unit 14 performs the above searching processing on the entire additional information 12', and as shown in FIG. 24I, detects the setting condition change positions. The consecution search unit 14 outputs information indicating the setting conditions change positions to the embedding condition setting unit 15.

Figure 25:
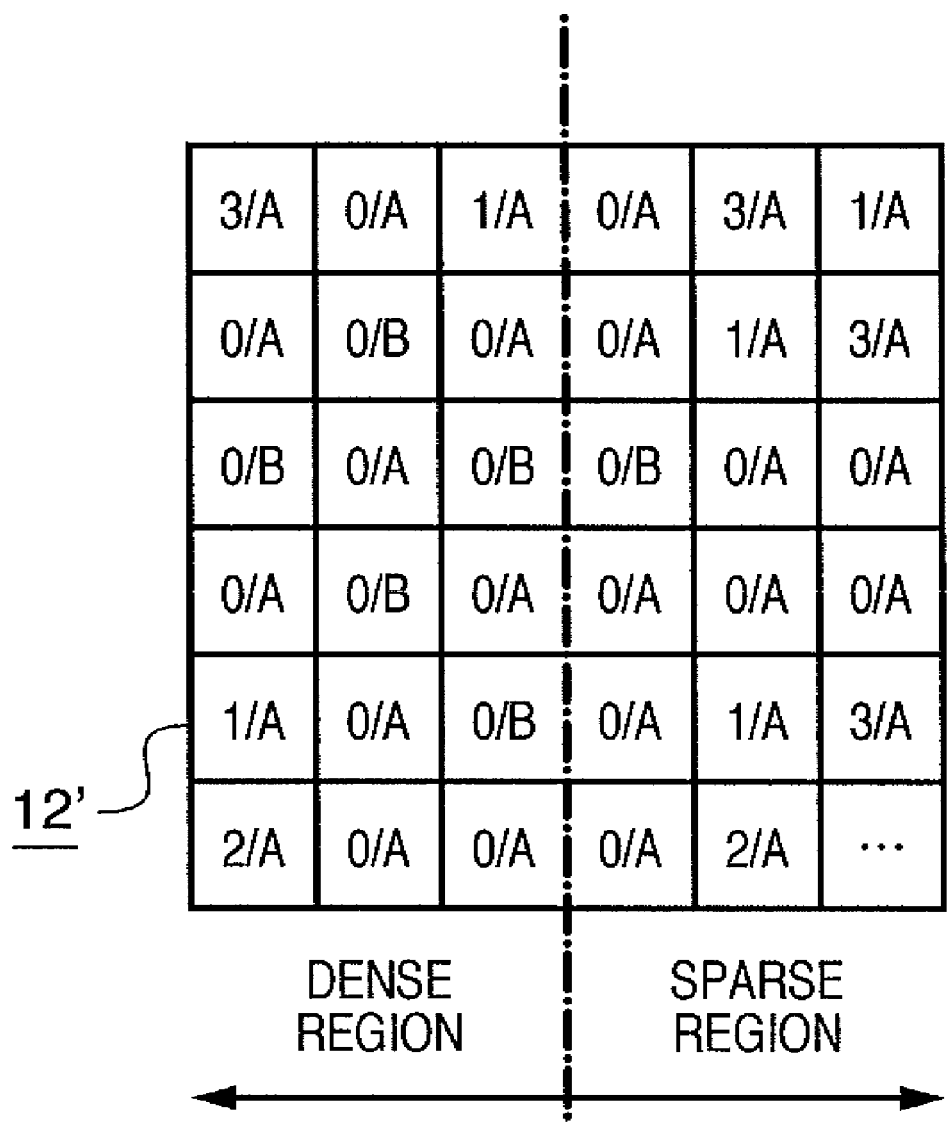
FIG. 25 is a matrix showing correspondence between the respective codes of the additional information and embedding conditions (multiplexing processing setting conditions)

FIG. 25 is a matrix showing correspondence between the respective codes of the additional information 12' and embedding conditions (multiplexing processing setting conditions). As shown in FIG. 25, from the result of consecution search, a code to be embedded in each block and embedding condition are set as e.g. "3/A" (code "3" is embedded on the condition A) or "0/B" (code "0" is embedded on the condition B). Note that the normal condition A is set for a code when the result of consecution search indicates that it is not a setting condition change position. The condition B is set for a code when the result of consecution search indicates that it is a setting condition change position.

Note that as described in the first embodiment, the embedding condition change positions, the number of change positions, the type of changed embedding condition and the like may be different from the above settings.

Further, in the present embodiment, the luminance histogram is utilized in the image analysis, however, image analysis by frequency analysis using discrete Fourier transformation or the like may be employed. For example, as a result of frequency analysis, the determination criterion of code consecution is raised in a block including many low frequency components in comparison with a block including many high frequency components. In this arrangement, in a region including many low frequency components, degradation of image quality due to repetition of conspicuous pattern can be suppressed. Further, it may be arranged such that a block including many high frequency components is detected by edge detection and the determination criterion of code consecution is changed as in the case of the above arrangement.

Further, it may be arranged such that an image in which additional information is to be embedded is divided into plural regions by region division method and the determination criterion of code consecution is changed by region. For example, in a region determined as a human face region, the determination criterion of code consecution may be set to a high level.

[Operation Procedure in Information Adding Device]

Figure 26:
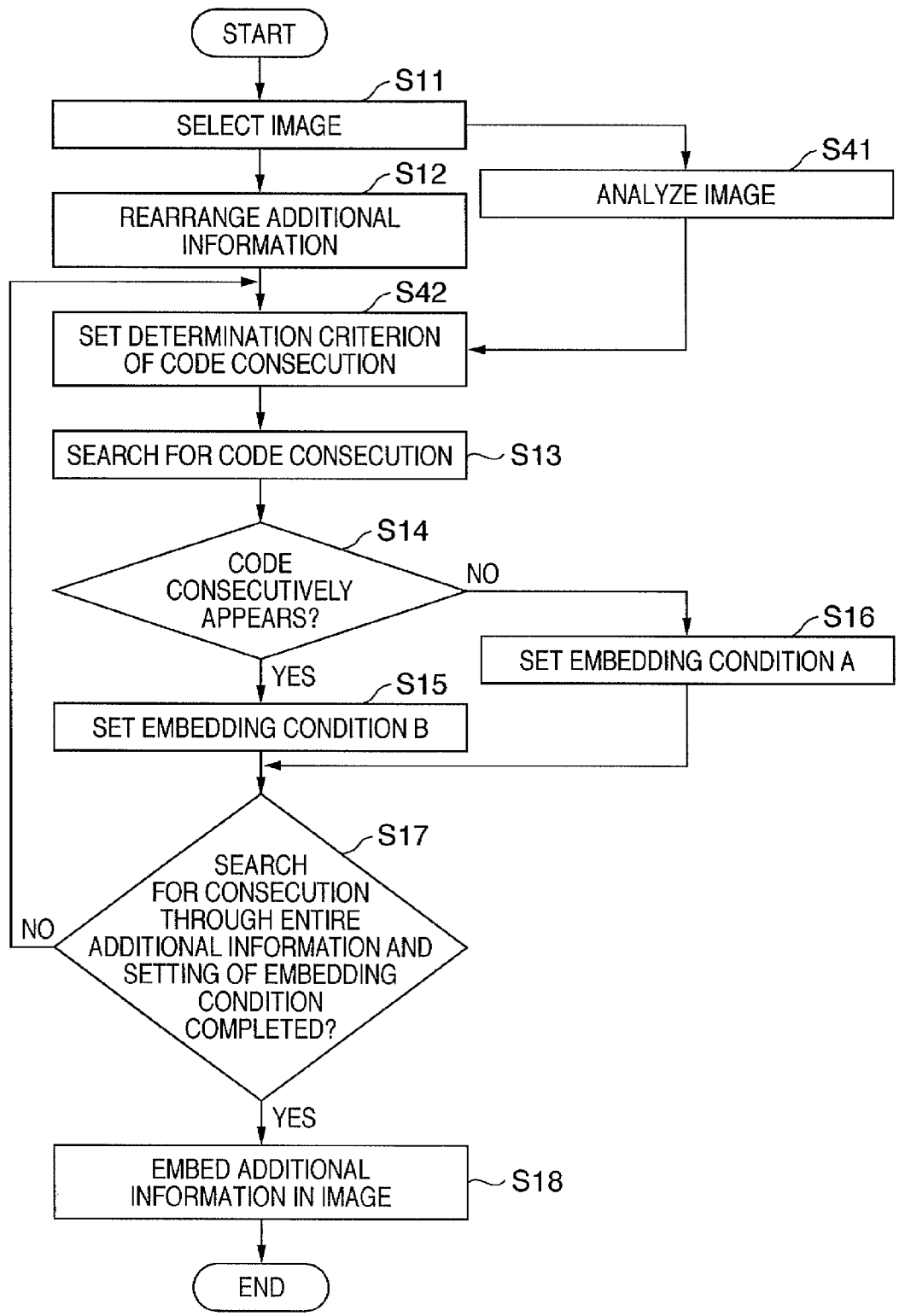
FIG. 26 is a flowchart showing the operation procedure in the information adding device.

FIG. 26 is a flowchart showing the operation procedure in the information adding device.

The difference from the operation procedure in the information adding device according to the first embodiment is that the image analysis unit 25 analyzes the characteristic of the image (S41), and the consecution search unit 14 sets the determination criterion of code consecution based on the result of analysis (S42).

Further, as the information extracting device and its operation procedure are the same as those in the first embodiment, detailed explanations thereof will be omitted.

In this manner, embedding processing, in consideration of image characteristic in addition to code consecution, can be realized by setting the determination criterion of code consecution in correspondence with image characteristic.

Further, as in the case of the first embodiment, the embedding condition in place of the determination criterion of code consecution may be changed in correspondence with image characteristic. Otherwise, a code is inserted or changed in correspondence with image characteristic as in the case of the second embodiment.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-050198, filed Feb. 28, 2007, which is hereby incorporated by reference herein in its entirety.

What is claimed is:

1. An image processing apparatus comprising:
an arrangement section, arranged to arrange a code string of additional information to be embedded in an image into a two-dimensional form;
a search section, arranged to search the arranged additional information for an area in which a same code consecutively appears for a predetermined number of codes, to find code consecutiveness;
a setting section, arranged to set a periodic image pattern used for embedding the arranged additional information based on a search result of the search section, wherein in a case where code consecutiveness is found, a first periodic image pattern is set for a part of code positions in an area having code consecutiveness, and a second periodic image pattern, which has a pattern phase different from a pattern phase of the first periodic image pattern is set for another part of the code positions so as to prevent repetition of the same periodic image pattern; and
an embedding section, arranged to embed the arranged additional information in the image in accordance with the periodic image pattern set by the setting section, wherein at least the embedding section is implemented using a processor.

2. The apparatus according to claim 1, wherein the embedding section divides the image into plural blocks, each of which has M×N pixels, and embeds a code of the arranged additional information in each block, and
wherein the arrangement section rearranges the additional information to the two-dimensional form in correspondence with an arrangement of the plural blocks.

3. The apparatus according to claim 1, wherein the search section searches for an area in which the same code appears consecutively for a predetermined number of codes, in at least two of vertical, horizontal and diagonal directions.

4. The apparatus according to claim 1, wherein the search section further searches for an area in which codes appear in a predetermined pattern.

5. The apparatus according to claim 1, further comprising:
an analyzing section, arranged to analyze a characteristic of the image in which the arranged additional information is to be embedded; and
a controller, arranged to control a search criterion used by the search section in searching for an area having the code consecutiveness, based on a result of the analysis.

6. An image processing apparatus comprising:
an arrangement section, arranged to arrange a code string of additional information to be embedded in an image into a two-dimensional form;
a search section, arranged to search the arranged additional information for an area in which a same code consecutively appears for a predetermined number of codes, to find code consecutiveness;
a modification section, arranged to perform modification on the arranged additional information to insert a code in a predetermined code position in the area having the code consecutiveness or to change a code of the predetermined code position so as to break the code consecutiveness, in a case where code consecutiveness is found, wherein when a code is inserted, the code inserted in the predetermined code position corresponds to a different pattern phase than a code adjacent to the predetermined code position, and when a code is changed, the code changed at the predetermined code position corresponds to a different pattern phase than a code at the predetermined code position before the code is changed; and
an embedding section, arranged to embed the arranged additional information, on which the modification is performed in the case where code consecutiveness is found, in the image, wherein at least the embedding section is implemented using a processor.

7. The apparatus according to claim 6, further comprising a calculating section arranged to calculate an amount of information embeddable in the image in which the arranged additional information is to be embedded,
wherein when the amount of the arranged additional information after code insertion or change exceeds the calculated amount, the modification section instructs the search section to change a search criterion used in searching for the code consecutiveness.

8. The apparatus according to claim 6, wherein the embedding section divides the image into plural blocks, each of which has M×N pixels, and embeds a code of the arranged additional information in each block, and
wherein the arrangement section rearranges the additional information into the two-dimensional form in correspondence with an arrangement of the plural blocks.

9. The apparatus according to claim 6, wherein the search section searches for an area in which a same code appears consecutively for a predetermined number of codes, in at least two of vertical, horizontal and diagonal directions.

10. The apparatus according to claim 6, wherein the search section further searches for an area in which codes appear in a predetermined pattern.

11. An image processing method comprising:
using a processor to perform the steps of:
arranging a code string of additional information to be embedded in an image into a two-dimensional form;
searching the arranged additional information for an area in which a same code consecutively appears for a predetermined number of codes, to find code consecutiveness;
setting a periodic image pattern for embedding the arranged additional information based on a search result in the searching step, wherein in a case where the code consecutiveness is found, a first periodic image pattern is set for a part of code positions in an area having code consecutiveness, and a second periodic image pattern, which has a pattern phase different from a pattern phase of the first periodic pattern is set for another part of the code positions so as to prevent repetition of the same periodic pattern; and
embedding the arranged additional information in the image in accordance with the periodic image pattern set in the setting step.

12. An image processing method comprising:
using a processor to perform the steps of:
arranging a code string of additional information to be embedded in an image into a two-dimensional form;
searching the arranged additional information for an area in which a same code consecutively for a predetermined number of codes, to find code consecutiveness;
performing modification on the arranged additional information to insert a code in a predetermined code position in the area having the code consecutiveness or to change a code of the predetermined code position so as to break the code consecutiveness, in a case where code consecutiveness is found in the searching step, wherein when a code is inserted, the code inserted in the predetermined code position corresponds to a different pattern phase than a code adjacent to the predetermined code position, and when a code is changed, the code changed at the predetermined code position corresponds to a different pattern phase than a code at the predetermined code position before the code is changed; and
embedding the arranged additional information, on which the modification is performed in the case where code consecutiveness is found, in the image.

13. A non-transitory computer-readable medium storing a computer executable program for causing a computer to implement an image processing apparatus according to claim 1.

14. A non-transitory computer-readable medium storing a computer executable program for causing a computer to implement an image processing apparatus according to claim 6.

* * * * *